United States Patent
Kim et al.

(10) Patent No.: US 9,495,575 B2
(45) Date of Patent: Nov. 15, 2016

(54) RING-TYPE MOBILE TERMINAL

(71) Applicant: LG ELECTRONICS INC., Seoul (KR)

(72) Inventors: Taeho Kim, Seoul (KR); Jaehun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/593,661

(22) Filed: Jan. 9, 2015

(65) Prior Publication Data

US 2016/0034742 A1 Feb. 4, 2016

(30) Foreign Application Priority Data

Jul. 30, 2014 (KR) ........................ 10-2014-0097492

(51) Int. Cl.
| | |
|---|---|
| *G06K 9/00* | (2006.01) |
| *G06F 3/01* | (2006.01) |
| *G06F 1/16* | (2006.01) |
| *G06F 21/32* | (2013.01) |
| *H04M 1/67* | (2006.01) |
| *H04M 1/725* | (2006.01) |
| *H04M 1/02* | (2006.01) |
| *H04B 1/3827* | (2015.01) |

(52) U.S. Cl.
CPC ........... *G06K 9/00013* (2013.01); *G06F 1/163* (2013.01); *G06F 3/017* (2013.01); *G06F 21/32* (2013.01); *G06K 9/00087* (2013.01); *H04B 1/385* (2013.01); *H04M 1/67* (2013.01); *H04M 1/7253* (2013.01); *H04B 2001/3861* (2013.01); *H04M 1/0202* (2013.01); *H04M 2250/12* (2013.01); *H04M 2250/22* (2013.01)

(58) Field of Classification Search
None
See application file for complete search history.

(56) References Cited

U.S. PATENT DOCUMENTS

| | | | | |
|---|---|---|---|---|
| 5,926,261 A | * | 7/1999 | Hoshino | G06K 9/00013 356/71 |
| 6,703,918 B1 | * | 3/2004 | Kita | G06F 21/32 340/5.52 |
| 8,243,131 B2 | * | 8/2012 | Choi | G06K 9/00033 348/77 |

(Continued)

FOREIGN PATENT DOCUMENTS

| | | |
|---|---|---|
| JP | 2005-242907 A | 9/2005 |
| WO | WO 00/68874 A1 | 11/2000 |

OTHER PUBLICATIONS

Toshiyuki (Computer English Translation of Japanese Patent No. JP, 2006-011614), pp. 1-14.*

*Primary Examiner* — Daniel Mariam
(74) *Attorney, Agent, or Firm* — Birch, Stewart, Kolasch & Birch, LLP

(57) ABSTRACT

A ring-type terminal including a main body configured to be placed on and surround a user's finger and including an insertion region in which the finger is inserted; a fingerprint sensor provided on at least one region of an inner circumferential surface of the main body and configured to recognize a fingerprint of the finger; a guide module provided on the inner circumferential surface such that the finger comes in contact with the fingerprint sensing module while the finger is inserted in the insertion region; and a controller configured to execute a function based on the fingerprint sensed by the fingerprint sensing module.

19 Claims, 50 Drawing Sheets

(56) References Cited

U.S. PATENT DOCUMENTS

| | | | | |
|---|---|---|---|---|
| 2006/0274920 A1* | 12/2006 | Tochikubo | .............. | G06F 21/32 |
| | | | | 382/124 |
| 2011/0007035 A1 | 1/2011 | Shai | | |
| 2012/0075196 A1* | 3/2012 | Ashbrook | ............... | G06F 3/014 |
| | | | | 345/173 |
| 2012/0321150 A1* | 12/2012 | Ranganathan | ........ | G06F 3/0488 |
| | | | | 382/124 |
| 2014/0218311 A1* | 8/2014 | Huang | ............... | G06K 9/00013 |
| | | | | 345/173 |
| 2014/0279528 A1* | 9/2014 | Slaby | ................. | H04L 63/0853 |
| | | | | 705/44 |

* cited by examiner

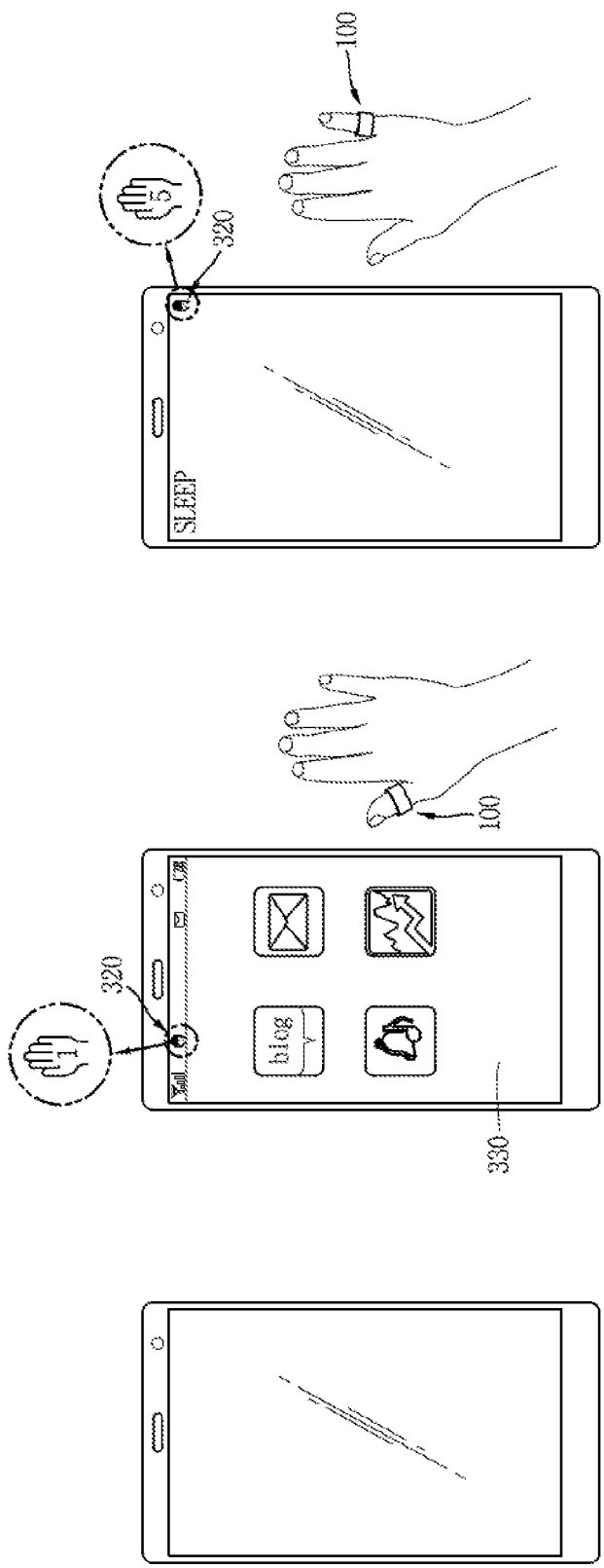

RING-TYPE MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0097492, filed on Jul. 30, 2014, the contents of which is incorporated by reference herein in its entirety.

BACKGROUND OF THE INVENTION

1. Field of the Invention

This present invention relates to a mobile terminal wearable on a finger.

2. Background of the Invention

Terminals may be divided into mobile/portable terminals and stationary terminals. Also, the mobile terminals may be classified into handheld terminals and vehicle mounted terminals. As it becomes multifunctional, a mobile terminal can be allowed to capture still images or moving images, play music or video files, play games, receive broadcast and the like, so as to be implemented as an integrated multimedia player.

A wearable type mobile terminal which is configured to be worn on a part of a user's body is under development, and a ring-type structure which is worn on the user's finger is being realized as a control device for transmitting and receiving control signals. Unlike mobile terminals which are wearable on a head or a wrist, the ring-type terminal senses very elaborate, complicated movements of the user's finger and also senses a peculiar fingerprint of the finger.

However, the currently-implemented ring-type terminal has a structure of being inserted merely into a finger and is utilized as a simple control device for sensing a control command while being worn on a user's finger.

SUMMARY OF THE INVENTION

Therefore, an aspect of the detailed description is to provide a ring-type mobile terminal, capable of controlling a preset function according to a terminal-worn (or mounted) finger by sensing the finger.

To achieve these and other advantages and in accordance with the purpose of this specification, as embodied and broadly described herein, there is provided a ring-type terminal including a main body that has a structure of surrounding a user's finger so as to form an insertion region in which the finger is inserted, a fingerprint sensing module that is provided on at least one region of an inner circumferential surface of the main body and configured to recognize a fingerprint of the finger, a guide module that is provided on the inner circumferential surface such that the finger comes in contact with the fingerprint sensing module while the finger is inserted in the insertion region, and a controller that is configured to execute a function based on the fingerprint sensed by the fingerprint sensing module.

In accordance with one embodiment disclosed herein, the ring-type terminal may further include a wireless communication unit that is configured to execute a wireless connection with a mobile terminal having a display module. The controller may control the wireless communication unit to transmit a first control command for outputting a graphic image to the display module, and the graphic image may include information related to the finger. Consequently, a fingerprint-associated function may be selected directly by using the ring-type terminal and a more accurate control command may be generated using the mobile terminal.

In accordance with one embodiment disclosed herein, the ring-type terminal may further include a wireless communication unit that is configured to execute a wireless connection with a plurality of external devices, and a gesture sensor that is configured to sense a gesture. The controller may control the wireless communication unit to transmit a control command generated based on the gesture to at least one of the plurality of external devices. Accordingly, a control command may be generated based on a gesture signal using the ring-type terminal.

In accordance with one embodiment disclosed herein, the controller may activate a different control mode based on the fingerprint, accordingly, devices can be controlled to be appropriate for a user.

In accordance with the present invention, a fingerprint sensing module and a guide unit for guiding a contact between the fingerprint sensing module and a finger, so as to enhance fingerprint sensing efficiency or quality when inserting a user's finger is inserted into the ring-type terminal.

Also, a main body of the ring-type terminal may be changed in shape according to a thickness of each finger, which may allow for obtaining an insertion region appropriate for each finger. Therefore, the ring-type terminal can be applied to various fingers with different thicknesses.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Hereinafter, the present invention will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. Furthermore embodiments are not limited by any of the details of the foregoing description, but rather should be construed broadly within its spirit and scope and it is intended that the present invention cover modifications and variations of this invention provided they come within the scope of the appended claims and their equivalents.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
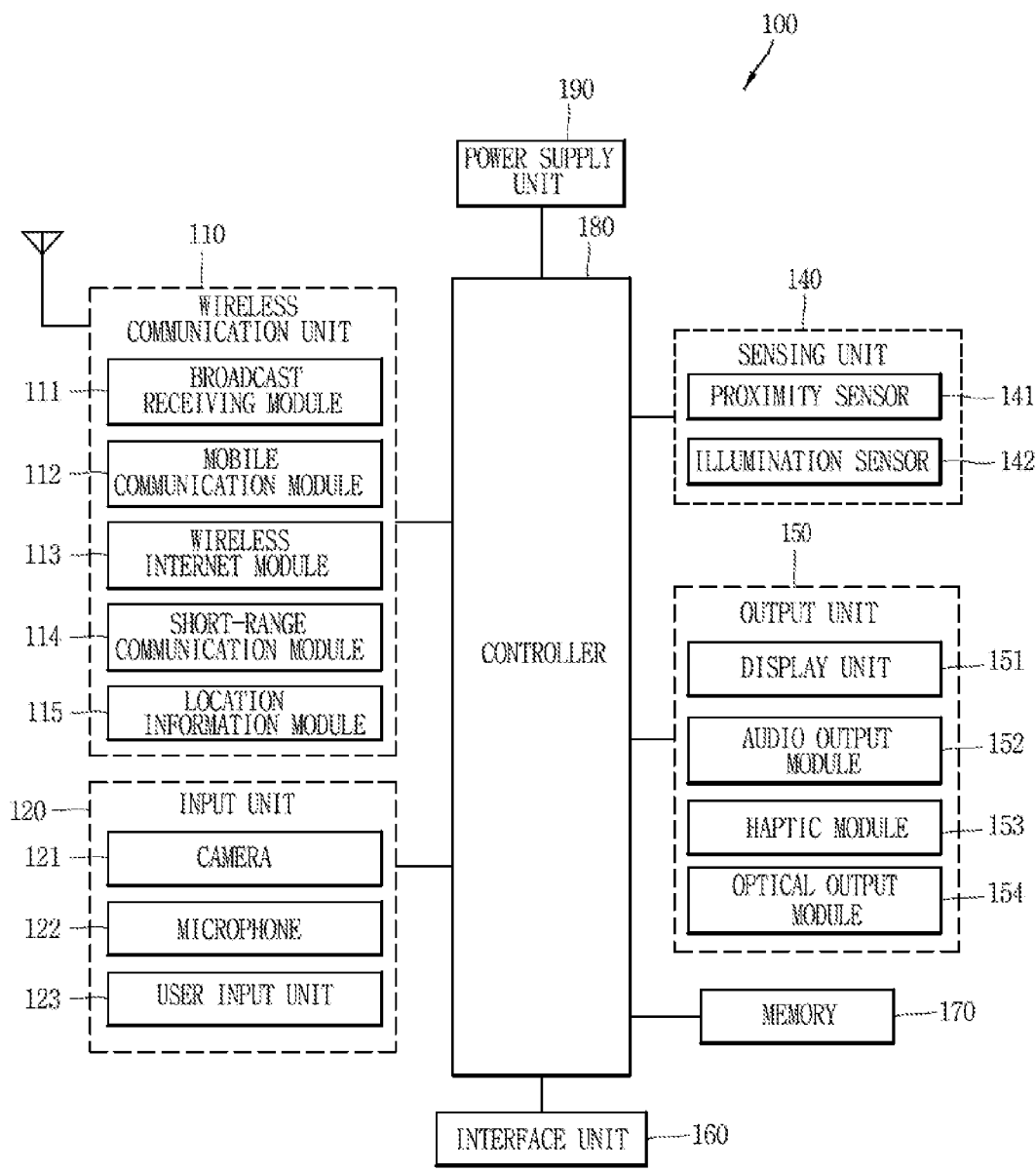
FIG. 1 is a block diagram of a mobile terminal according to one embodiment of the present invention.

FIG. 1 is a block diagram of a mobile terminal in accordance with one embodiment of the present invention. The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, among those components, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Also, the wireless communication unit 110 may include at least one module connecting the mobile terminal 100 to at least one network.

The wireless communication unit 110 may include at least one of a broadcast receiving module 111, a mobile communication module 112, a wireless Internet module 113, a short-range communication module 114, a location information module 115 and the like.

The input unit 120 may include a camera 121 (or an image input device) for an image signal input, a microphone 122 (or an audio input device) for an audio signal input, and a user input unit 123 (for example, a touch key, a push key, a mechanical key, a soft key, and the like) for allowing a user to input information. Data (for example, audio, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal 100 may be configured to utilize information obtained from the sensing unit 140, and in particular, information obtained from at least two sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs (or applications) executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operations of the mobile terminal 100, in addition to the operations associated with the application programs. The controller 180 can provide or process information or functions appropriate for a user by processing signals, data, information and the like, or activating application programs stored in the memory 170.

Also, the controller 180 can control some or all of the components illustrated in FIG. 1 according to the execution of an application program that have been stored in the memory 170. In addition, the controller 180 can combine two or more components included in the mobile terminal 100 for operation to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal according to various embodiments disclosed herein. Also, the operation, the control or the control method of the mobile terminal may be implemented on the mobile terminal by activating at least one application program stored in the memory 170.

Hereinafter, prior to describing various embodiments implemented by the mobile terminal 100, each of the aforementioned components will be described in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000, Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-Advance (LTE-A), and the like).

Examples of wireless signals may include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), LTE-Advance (LTE-A), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct and Wireless USB. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks may be a wireless personal area network.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform a function of another module of the wireless communication unit 110, in order to obtain data associated with a location of the mobile terminal in a replacing manner or an additional manner.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of control methods which may be realized in the thusly-configured mobile terminal and related embodiments, with reference to the accompanying drawings. It may be obvious to those skilled in the art that the present invention can be specified into other specific forms without departing from the scope and essential features of the present invention.

Figure 2A:
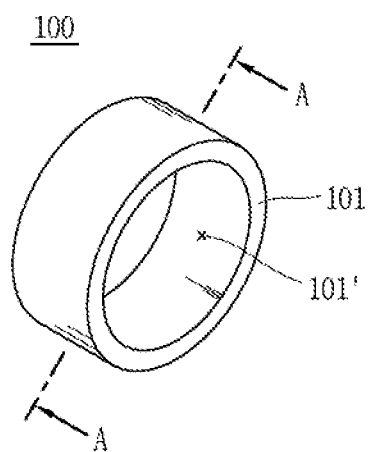
FIGS. 2A and 2B are conceptual views of ring-type terminals according to different embodiments, each viewed in one direction.
Figure 2B:
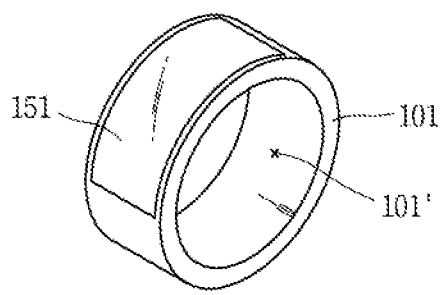
Figure 2C:
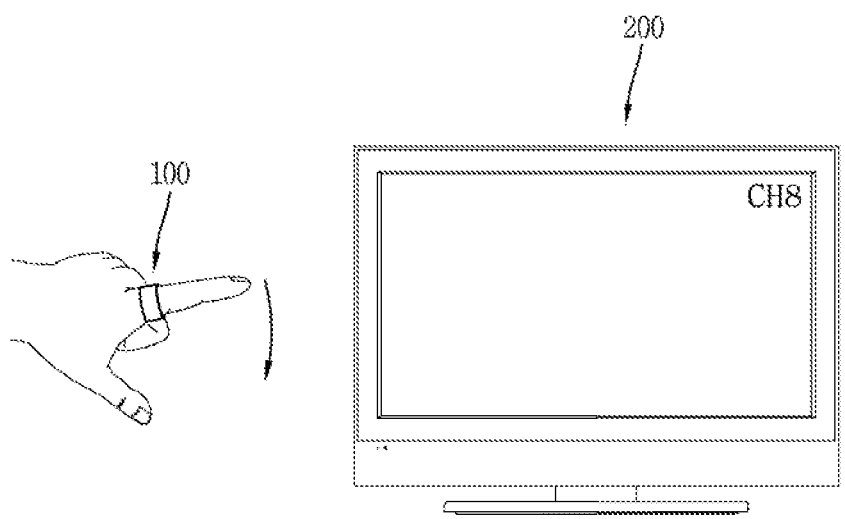
FIGS. 2C(a) and 2C(b) is a conceptual view illustrating a ring-type terminal wirelessly connected with an external device.
Figure 2C:
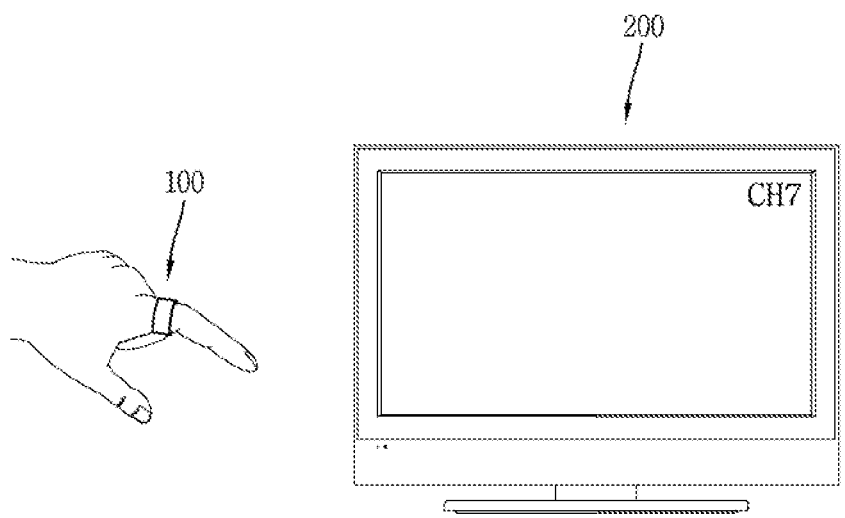

FIGS. 2A and 2B are conceptual views of ring-type terminals according to different embodiments, each viewed in one direction, and FIGS. 2C(a) to 2C(b) are conceptual views illustrating the ring-type terminal wirelessly connected with an external device.

As illustrated in FIG. 2A, a ring-type terminal 100 in accordance with one embodiment includes an annular main body 101 which defines an insertion region 101' in which a finger is inserted and surrounds the finger. The main body 101 may have a preset width w and a preset thickness d. The width w and the thickness d of the main body 101 may also not be preset. The main body 101 may be provided with electronic components, which are mounted thereon and configure a user input unit for receiving a user input and an output unit for outputting information.

As illustrated in FIGS. 2C(a) and 2C(b), the ring-shape terminal 100 may be wirelessly connected with at least one external device. The wireless communication unit 110 of the ring-type terminal 100 may transmit and receive wireless signals to and from at least one external device 200, which is located close to the ring-type terminal 100 or set to be wirelessly connected to the ring-type terminal 100.

For example, the ring-type terminal 100 may be disposed (mounted, worn) on one of user's fingers. The user may input a gesture command while wearing the ring-type terminal 100 on the finger. The controller 180 can control the wireless communication unit 110 to transmit the gesture command to the external device 200. That is, the user may control the external device by applying a control command to the ring-type terminal which is worn on his or her finger.

The ring-type terminal 100 disclosed herein includes a fingerprint sensing module 400 which is located on an inner circumferential surface of the main body 101. The fingerprint sensing module 400 senses a peculiar fingerprint present on the user's finger on which the ring-type terminal 100 is worn.

FIG. 2B illustrates a ring-type terminal having a display unit on an outer circumferential surface thereof. The display unit 151 is formed on an outer circumferential surface of the main body 101. The display unit 151 may be disposed on one region of the outer circumferential surface, but not limited to this. The display unit 151 outputs visual information according to functions of the ring-type terminal. An appearance of the ring-type terminal disclosed herein may not be limited to that illustrated in the drawings.

A ring-type terminal disclosed herein may include a fingerprint sensing module which is provided on an inner circumferential surface of a main body to recognize a fingerprint of a finger. Different functions can be activated according to a user's fingerprint sensed. Hereinafter, a detailed structure of the ring-type terminal having the fingerprint sensing module will be described.

Figure 3A:
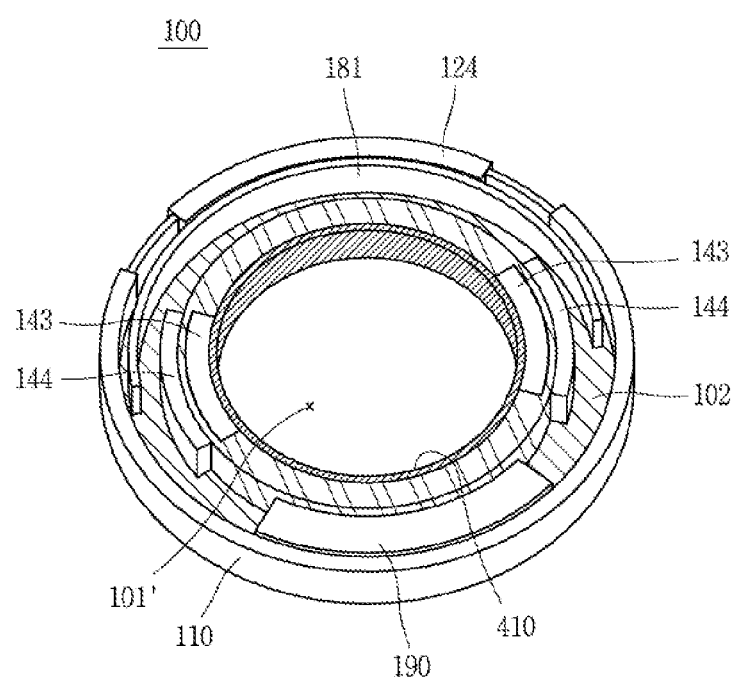
FIG. 3A is a sectional view of a ring-type terminal in accordance with one embodiment illustrated in FIG. 2A.
Figure 3B:
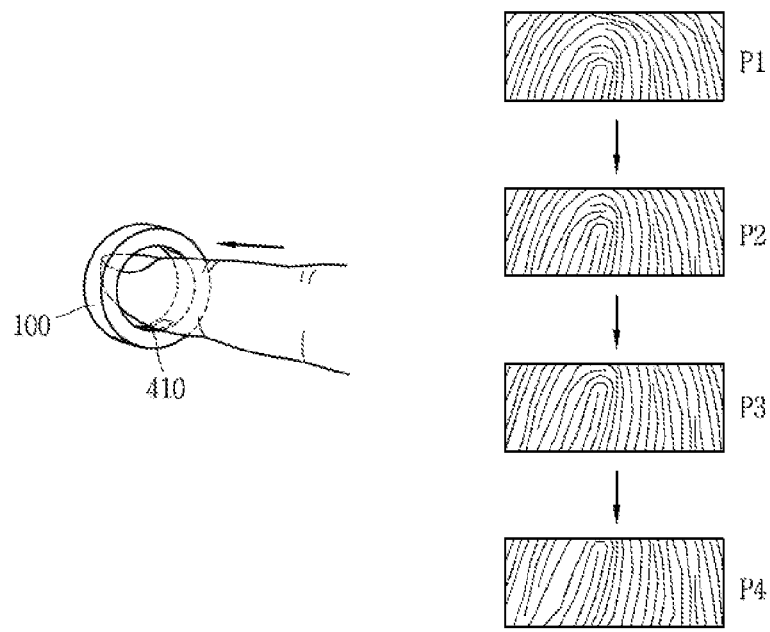
FIG. 3B is a conceptual view illustrating a fingerprint sensing module provided on a ring-type terminal in accordance with one embodiment.

FIG. 3A is a sectional view of a ring-type terminal in accordance with one embodiment illustrated in FIG. 2A, and FIG. 3B is a conceptual view illustrating a fingerprint sensing module mounted on a ring-type terminal in accordance with one embodiment.

Hereinafter, a structure of a ring-type terminal according to one embodiment will be described with reference to FIG. 3A. The ring-type terminal 100 according to one embodiment may include a frame 102 which has an annular structure for forming an insertion region 101' and is provided with an inner circumferential surface and an outer circumferential surface, a first fingerprint sensing module 410, a touch sensor 124, an electrode module 143, a detection module 144, a wireless communication unit 110, a flexible printed circuit board (FPCB) 181, and a power supply unit 190. Also, the ring-type terminal 100 may further include an outer case which covers the frame 102 and components mounted on the frame 102.

The frame 102 and the outer case of the ring-type terminal 100 may be formed of stainless steel. However, without the limit to this, materials forming the frame and the case may include metallic materials, plastic, elastic materials and the like.

An outside and an inside of the ring-type terminal 100 may be formed of different materials from each other. For example, the outer case may be formed of stainless steel and an inner circumferential surface of the ring-type terminal 100 may be made of an elastic material. Or, the outer case may be formed of a metal for enhancing radiation, and the inner circumferential surface may be formed of a material easily absorbing sweat. Further, the outer case may be provided with a plurality of holes for radiating heat. For example, the plurality of holes may be formed from the outer case toward the inner circumferential surface, and also extend up to the insertion region 101'. The plurality of holes may be arranged adjacent to the fingerprint sensing module 400.

The touch sensor 124 may be formed on at least partial region of the outer circumferential surface of the frame 102. The touch sensor 124 may generate a control command by receiving a user's touch input. In addition, when the touch sensor 124 is formed on the partial region of the outer circumferential surface of the frame 102, the frame 102 may further include a protrusion for indicating a region where the touch sensor 124 is formed. Also, the region where the touch sensor 124 is formed may not be limited to the illustrated example.

The wireless communication unit 110 may be formed along the outer circumferential surface of the frame 102. The wireless communication unit 110 may include a radio frequency (RF) antenna and a communication module. For example, if the case forming an appearance of the ring-type terminal 100 is made of a metal, the case may operate as an antenna radiator. The controller may transmit and receive wireless signals through wireless communication between the wireless communication unit 110 and an external device. For example, the wireless communication unit 110 may use short-range communication technologies, such as Bluetooth™, Radio Frequency Identification (RFID), Infrared Data Association (IrDA), Ultra Wideband (UWB), ZigBee, Near Field Communication (NFC) and the like. The controller 180 can control the wireless communication unit 110 to perform the wireless communication with an external device adjacent thereto when the ring-type terminal 100 is activated, or control the wireless communication unit 110 to perform a wireless connection with a preset external device of a plurality of external devices.

The electrode module 143 and the detection module 144 are formed on a part of the inner circumferential surface of the frame 102. The electrode module 143 and the detection module 144 detect a movement of a finger which is inserted through the insertion region 101'. That is, the detection module 144 detects an operation that the ring-type terminal 100 is worn on the finger or removed from the finger.

In more detail, the electrode module 143 are provided with a plus (+) electrode and a minus (−) electrode which face each other with interposing the insertion region 101' therebetween. The pair of electrodes are disposed on the inner circumferential surface to be adjacent to each other. The detection module 144 detects changes of electromagnetic fields of the pair of electrodes. The detection module 144 may detect the changes of the electromagnetic fields of the pair of electrodes so as to detect a direction that the finger is inserted into and removed from the insertion region 101', namely, a direction that the finger moves through the insertion region 101'. That is, the detection module 144 may detect whether the user is in the course of wearing the ring-type terminal 100 on a finger or in the course of removing the ring-type terminal 100 from the finger. The controller 180 can control a different function to be activated according to the direction that the ring-type terminal 100 moves along the finger based on the detection of the detection module 144.

Meanwhile, the ring-type terminal 100 may include a proximity sensor (not illustrated) which is implemented as an infrared sensor, instead of the electrode module 143 and the detection module 144. The proximity sensor may detect a state where the finger is located adjacent to the insertion region 101' of the ring-type terminal 100.

The FPCB 181 is disposed within the frame 102. It is illustrated in the drawing that the FPCB 181 is located between the inner circumferential surface and the outer circumferential surface of the frame 102, but the position of the FPCB 181 may not be limited to this. For example, the FPCB 181 may be formed on the outer circumferential surface of the frame 102 and covered by the case (not illustrated). The FPCB 181 generates a control command by being connected to electronic components which are disposed within the frame 102.

The power supply unit 190 is located within the frame 102. The power supply unit 190 may be implemented as an arcuate type battery which is formed curved. The battery may be formed in a curved shape to correspond to a curvature of the frame 102, and mounted in the frame 102.

The ring-type mobile terminal 100 may include an interface unit (not illustrated) for a wired connection with an external device. The power supply unit 190 may be charged in a wired manner through the interface unit or charged in a wireless manner.

The first fingerprint sensing module 410 may be formed on the inner circumferential surface of the frame 102. The controller 180 can control the first fingerprint sensing module 410 to sense a user who is wearing the ring-type terminal 100 and a user's finger where the ring-type terminal 100 is worn. The first fingerprint sensing module 410 according to this embodiment forms a closed loop along the inner circumferential surface. That is, the user may allow the fingerprint sensing module 410 to recognize a fingerprint by contacting his or her finger with a region of the inner circumferential surface of the ring-type terminal 100.

FIG. 3B is a conceptual view illustrating fragmentary fingerprint images obtained by the first fingerprint sensing module 410 illustrated in FIG. 3A. For example, the user may wear the ring-type terminal 100 on a forefinger by moving the forefinger on the first fingerprint sensor 410 in a sliding manner. Here, the first fingerprint sensing module 410 continuously obtains fragmentary fingerprint images P1 to P4 of the forefinger which is slid thereon. That is, the fingerprint images are fragmentary but sequentially obtained in a continuous form, accordingly, those fingerprint images may be matched into one image.

The controller 180 compares the fingerprint images with a preset fingerprint of the user, and executes a preset function when the fingerprint images are equal to the preset fingerprint. In accordance with this embodiment, while the finger is inserted through the insertion region 101', the fingerprint is sensed by the first fingerprint sensing module 410. Therefore, the finger with the ring-type terminal 100 worn thereon may be sensed and an associated function may be executed accordingly.

Figure 3C:
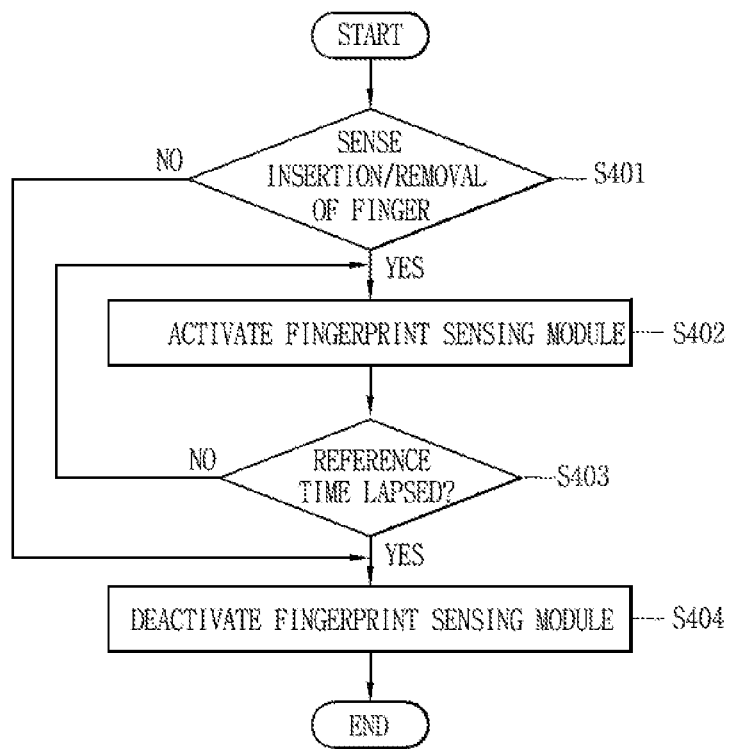
FIG. 3C is a flowchart illustrating a method of activating a fingerprint sensing module disclosed herein.

FIG. 3C is a flowchart illustrating a method of activating a fingerprint sensing module disclosed herein. The fingerprint sensing module 400 remains inactive in a standby state that the ring-type terminal 100 is not worn on a finger. The detection module 144 detects whether a finger is inserted in or removed from the ring-type terminal 100 (S401). The controller 180 maintains the inactive state of the fingerprint sensing module 400 if the insertion or removal of the finger is not detected by the detection module 144.

Meanwhile, the controller 180 activates the fingerprint sensing module 400 when the insertion or removal of the finger is sensed (S402). The controller 180 can activate the fingerprint sensing module 400 to detect the user's fingerprint when the finger is inserted into or removed from the ring-type terminal 100 by being slid along the insertion region 101'.

The controller 180 senses a lapse or non-lapse of a preset reference time, starting from the moment that the fingerprint sensing module 400 is activated (S403). When the reference time has not lapsed yet, the controller 180 controls the fingerprint sensing module 400 to remain active. When the reference time has lapsed, the controller 180 deactivates the fingerprint sensing module 400 (S404).

Or, the controller 180 can determine whether or not images sensed by the fingerprint sensing module 400 are changed, and deactivate the fingerprint sensing module 400 when there is no change in the images for the reference time.

Accordingly, the controller 400 may control the fingerprint sensing module 400 to be activated when the user wears or removes the ring-type terminal 100 on or from a finger. The controller 180 can switch the fingerprint sensing module 400 into the inactive state when the reference time has lapsed, irrespective of whether the ring-type terminal 100 is being worn on the user's finger. This may result in a reduction of power consumption caused due to sensing of a fingerprint.

Figure 4A:
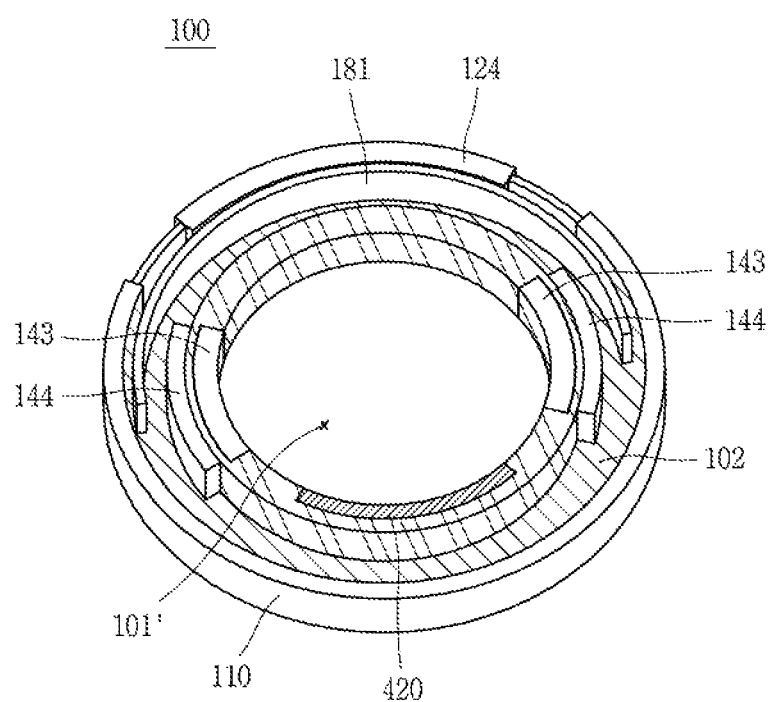
FIG. 4A is a conceptual view illustrating a ring-type terminal having a fingerprint sensing module provided on one region of an inner circumferential surface thereof in accordance with another embodiment.
Figure 4B:
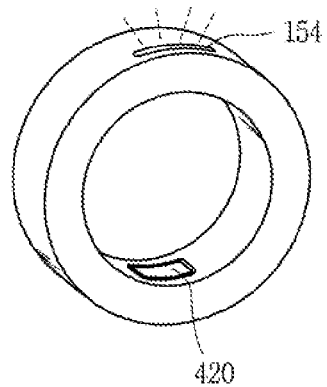
FIGS. 4B(a) to 4B(c) are conceptual views illustrating a control method of outputting guide information for guiding a position of a finger by use of a fingerprint sensing module in accordance with one embodiment.
Figure 4B:
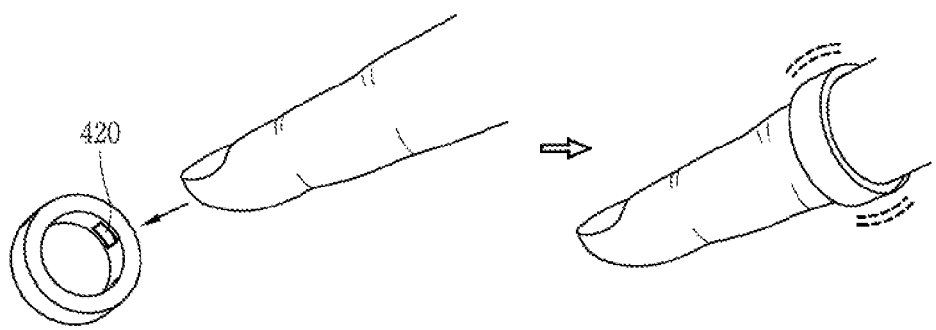
Figure 4B:
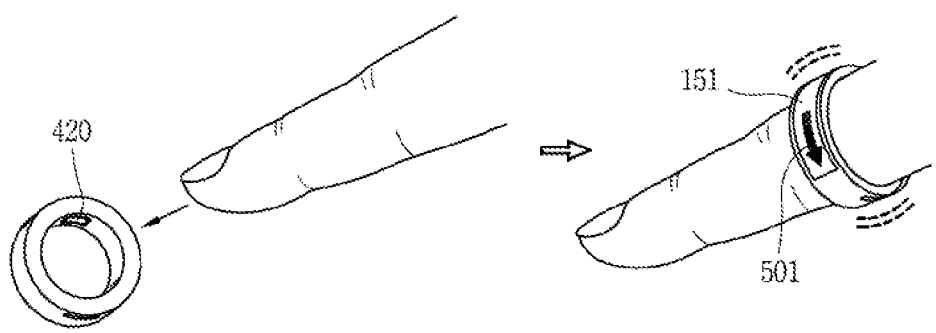

FIG. 4A is a conceptual view illustrating a ring-type terminal having a fingerprint sensing module formed on one region of an inner circumferential surface in accordance with another embodiment, and FIGS. 4B(a) to 4B(c) are conceptual views illustrating a control method of outputting guide information for guiding a position of a finger by use of the fingerprint sensing module.

As illustrated in FIG. 4A, a ring-type terminal 100 according to this embodiment may include a frame 102 having an annular structure and provided with an inner circumferential surface and an outer circumferential surface, a second fingerprint sensing module 420, a touch sensor 124, an electrode module 143, a detection module 144, a wireless communication unit 110, and an FPCB 181 and a power supply unit 190. Those components of the ring-type terminal according to this embodiment are substantially the same as those of the ring-type terminal 100 of FIG. 3A, except for the second fingerprint sensing module 420. Therefore, the same reference numerals are given to the same components and description thereof will be omitted.

The second fingerprint sensing module 420 is formed on one region of the inner circumferential surface of the frame 102. A length of the fingerprint sensing module 420 is preferably greater than a size of the finger. Also, the second fingerprint sensing module 420 is preferably formed to face the touch sensor 124 with interposing the insertion region 101' therebetween.

Hereinafter, description will be given of a control method for outputting guide information such that the finger can exactly contact the second fingerprint sensing module 420, with reference to FIGS. 4B(a) to 4B(c). The ring-type terminal according to FIG. 4B(a) includes an optical output module 154 formed on the outer circumferential surface. For example, the optical output module 154 may be a light-emitting diode (LED) module. The controller 180 can control the optical output module 154 to indicate whether or not the fingerprint sensing module 400 has sensed the fingerprint by emitting light.

For example, the controller 180 controls the optical output module 154 not to emit light when the fingerprint is sensed by the second fingerprint sensing module 420, and to emit light when the fingerprint has is not sensed by the second fingerprint sensing module 420. The controller 180 controls the optical output module 154 to emit light when the fingerprint is not sensed by the second fingerprint sensing module 420 while the insertion or removal of the finger with respect to the ring-type terminal 100 is detected by the detection module 144.

Or, the controller 180 can control the optical output module 154 to emit light of a different color when the fingerprint is sensed or not sensed by the second fingerprint sensing module 420.

The controller 180 can determine a finger corresponding to a fingerprint when the fingerprint has been sensed by the fingerprint sensing module 400, and control the optical output module 154 to output light of a different color according to a different finger. Accordingly, the user may recognize whether a finger has been inserted into the ring-type terminal 100, whether a fingerprint has been properly sensed by the fingerprint sensing module 400, and on which finger the ring-type terminal 100 has been worn. This allows the user to visually determine whether a fingerprint has been sensed while wearing the ring-type terminal, and detect a fingerprint by moving the ring-type terminal based on emitted light.

Referring to FIG. 4B(b), the ring-type terminal 100 may include the haptic module 153 which generates vibration. The controller 180 can control the haptic module 153 to generate the vibration when a fingerprint is sensed by the second fingerprint sensing module 420. Accordingly, the user can recognize based on the vibration that the fingerprint has been sensed when the ring-type terminal 100 is worn on a finger.

Or, the controller 180 can control the detection module 154 to detect an insertion of a finger into the insertion region 101', and control the haptic module 153 to generate vibration when a fingerprint is not sensed by the second fingerprint sensing module 420. Accordingly, the user may recognize that the fingerprint has not been sensed by the second fingerprint sensing module 420 and move the ring-type terminal 100 to change a position of the ring-type terminal 100 such that the fingerprint can be sensed again by the second fingerprint sensing module 420.

According to this embodiment, the user may determine based on the output vibration whether or not the user's fingerprint has been sensed by the fingerprint sensing module. Also, the haptic module 153 may be located within the ring-type terminal 100 so as to more simplify the appearance of the ring-type terminal 100.

Referring to FIG. 4B(c), the ring-type terminal 100 further includes a display unit 151 which outputs visual information. For example, the display unit 151 may be integrally formed with the touch sensor 124. The display unit 151 may be formed to face the second fingerprint sensing module 420, but the position of the display unit 151 may not be limited to this. The display unit 151 may also be formed substantially overall along an outer circumferential surface of the main body 101.

The controller 180 controls the display unit 151 to output guide information 501 which indicates a turning direction of the ring-type terminal 100 when the user's fingerprint has not been sensed by the second fingerprint sensing module 420. For example, if the ring-type terminal 100 is worn such that the second fingerprint sensing module 420 is located to left of a portion of the finger where the fingerprint is formed, the display unit outputs an arrow indicating a right side as the guide information 501. According to length and shape of the arrow, the position where the second fingerprint sensing module 420 is located may be indicated more precisely.

In accordance with this embodiment, even without directly checking a region where the second fingerprint sensing module 420 is formed, the position of the fingerprint sensing module can be fast recognized. The embodiments illustrated in FIGS. 4B(a) to 4B(c) may be implemented by a combination thereof. For example, when a fingerprint is not sensed by the second fingerprint sensing module 420, the controller 180 can control the haptic module 153 to output the vibration, and control the display unit to output the guide information on one region of the display unit 151 corresponding to the second fingerprint sensing module 420. In this instance, the user may recognize based on the vibration that the fingerprint has not been sensed, and move the ring-type terminal such that the fingerprint can contact the region outputting the guide information.

Figure 4C:
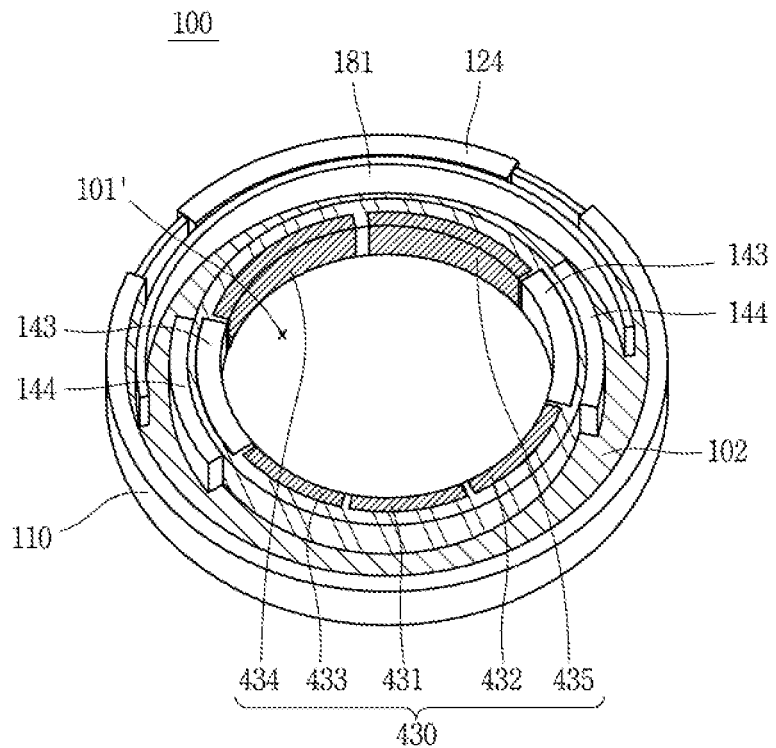
FIGS. 4C(a) and 4C(b) are conceptual views illustrating a ring-type terminal having a plurality of fingerprint sensing portions in accordance with one embodiment.
Figure 4C:
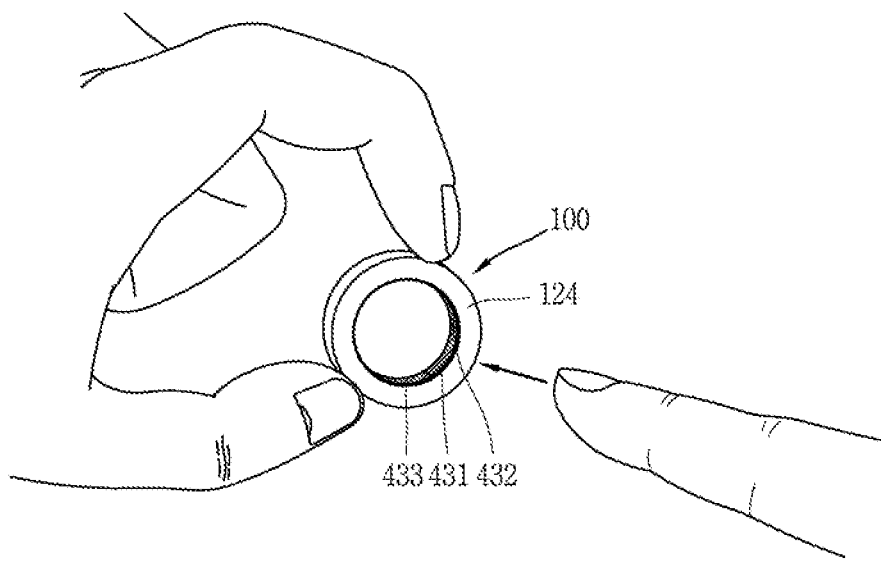

FIG. 4C is a conceptual view illustrating a ring-type terminal having a plurality of fingerprint sensing portions. As illustrated in FIG. 4C(a), the ring-type terminal may include a frame 102 having an annular structure and provided with an inner circumferential surface and an outer circumferential surface, a third fingerprint sensing module 430, a touch sensor 124, an electrode module 143, a detection module 144, a wireless communication unit 110, a FPCB 181, and a power supply unit 190. Those components of the ring-type terminal according to this embodiment are substantially the same as those of the ring-type terminal 100 of FIG. 3A, except for the third fingerprint sensing module 430. Therefore, the same reference numerals are given to the same components and description thereof will be omitted.

The third fingerprint sensing module 430 according to this embodiment includes first to fifth fingerprint sensing portions 431, 432, 433, 434 and 435. The third fingerprint sensing module 430 is formed along the inner circumferential surface of the main body. The first to fifth fingerprint sensing portions 431, 432, 433, 434 and 435 are preferably arranged adjacent to one another. It is illustrated in the drawing that the first to fifth fingerprint sensing portions 431, 432, 433, 434 and 435 do not overlap the electrode module 143. However, the third fingerprint sensing module 430 according to one embodiment may be implemented to partially overlap the electrode module 143. The first to fifth fingerprint sensing portions 431, 432, 433, 434 and 435 may have substantially the same size, without being limited to this. The first to fifth fingerprint sensing portions 431, 432, 433, 434 and 435 are independently controlled by the controller 180. That is, the controller 180 can activate only one of the first to fifth fingerprint sensing portions 431, 432, 433, 434 and 435.

Referring to FIGS. 4C(b), the controller 180 can activate some of the first to fifth fingerprint sensing portions 431, 432, 433, 434 and 435 based on a user's touch input sensed by the touch sensor 124. The touch sensor 124 senses two touch points on which the user's two fingers come in contact with the outer circumferential surface. The controller 180 controls the third fingerprint sensing module 430 to sense the fingerprint by activating the first fingerprint sensing portion 431 which is spaced the farthest from the two points.

With activating some of the plurality of fingerprint sensing portions, power consumption caused due to activating the third fingerprint sensing module 430 can be reduced. Also, since a fingerprint sensing portion which corresponds to a position with which the user's finger comes in contact is activated, a problem that a fingerprint is not sensed due to a non-contact of the user's finger may be overcome.

Figure 4D:
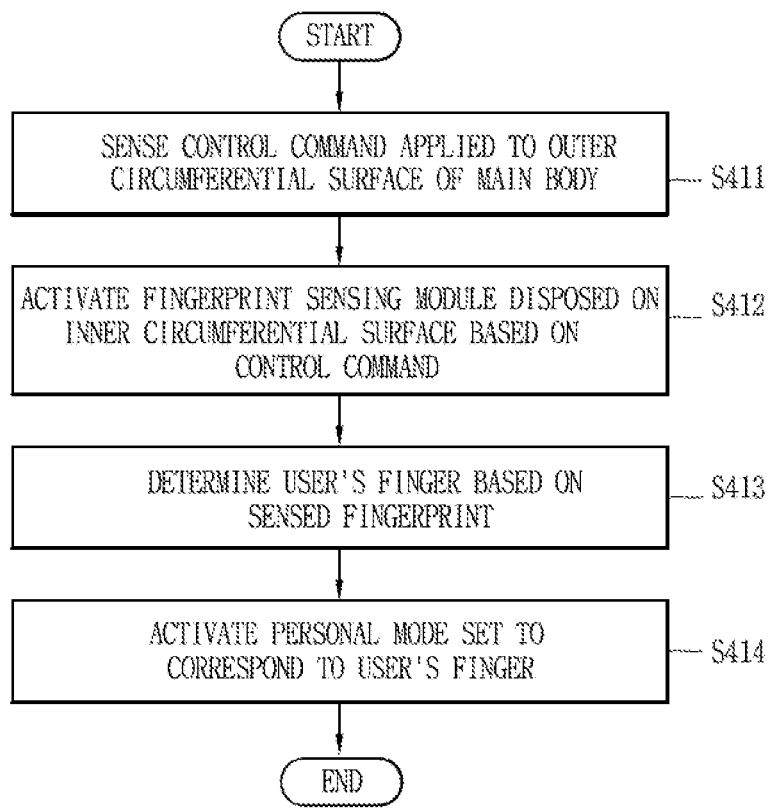
FIG. 4D is a flowchart illustrating a control method for a ring-type terminal disclosed herein in accordance with one embodiment.

FIG. 4D is a flowchart illustrating a control method for a ring-type terminal disclosed herein. A control command applied to the outer circumferential surface of the main body is sensed (S411). The control command may be applied to the touch sensor formed on the outer circumferential surface.

The controller 180 activates the fingerprint sensing module 400 located on the inner circumferential surface based on the control command, to sense a fingerprint (S412). The controller 180 can activate the fingerprint sensing module 400 or a part of the fingerprint sensing module 400 based on one region of the outer circumferential surface to which the control command has been applied.

The controller 180 determines a user's finger based on the sensed fingerprint (S413), and activates a personal mode, which has been set to correspond to the user's finger (S414). Here, the personal mode includes a function or mode which has been set to correspond to the user or each finger of the user.

The user's fingerprint is formed on one surface of the distal portion of a finger, and the insertion region of the ring-type terminal is formed widely so as to be fixed to the proximal portion close to the palm of the hand. The ring-type terminal 100 disclosed herein is provided with a guide unit which guides the user's fingerprint to come in contact with the fingerprint sensing module. Hereinafter, a detailed structure of the guide unit will be described.

Figure 5A:
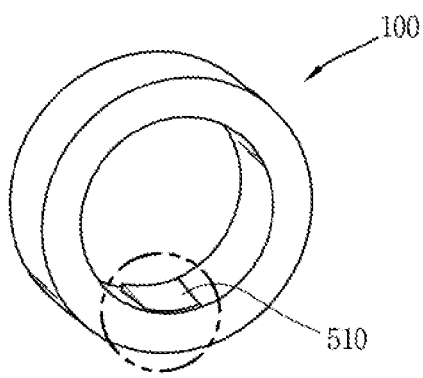
FIGS. 5A(a) to 5C are conceptual views illustrating a ring-type terminal having a guide unit in accordance with different embodiments.
Figure 5A:
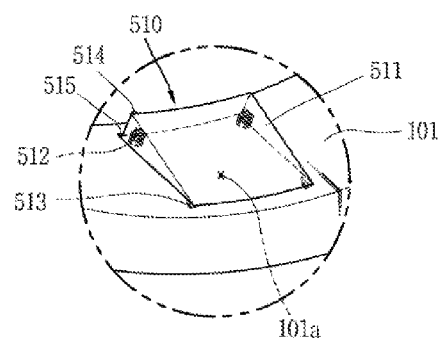
Figure 5A:
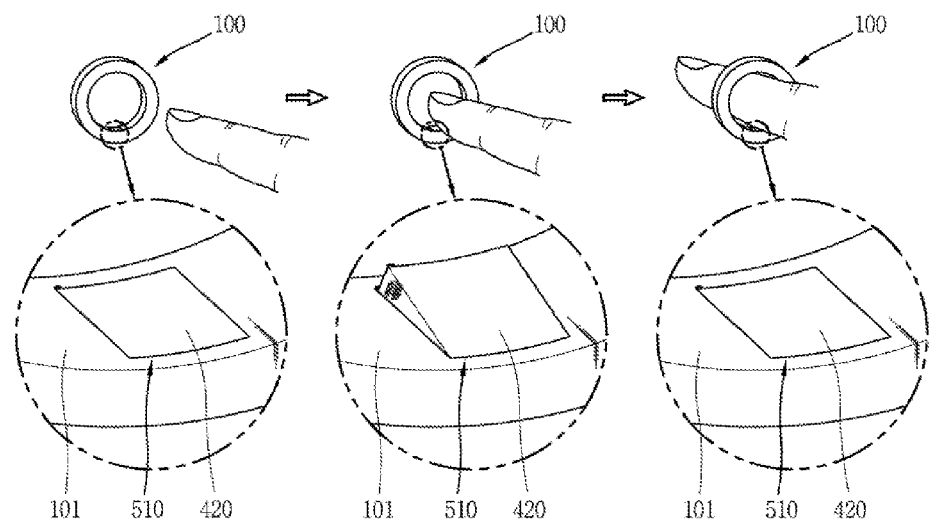
Figure 5B:
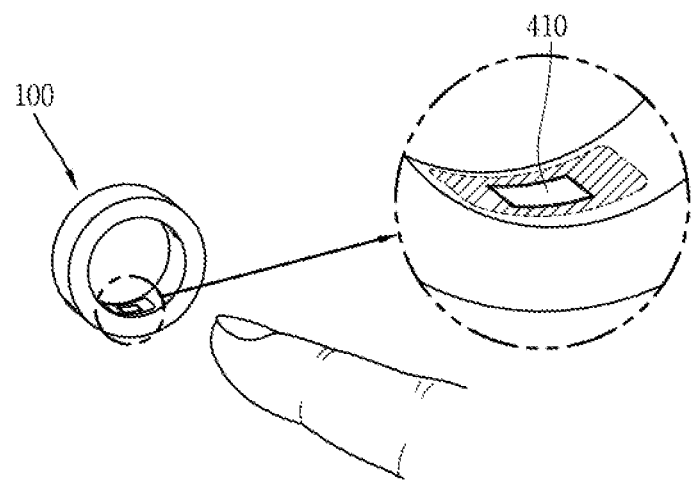
Figure 5B:
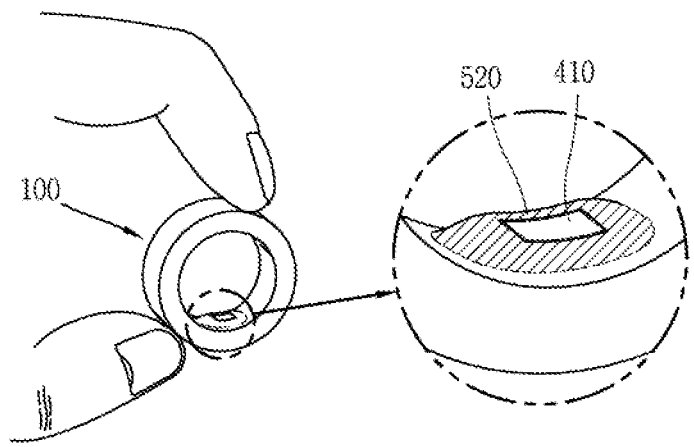
Figure 5B:
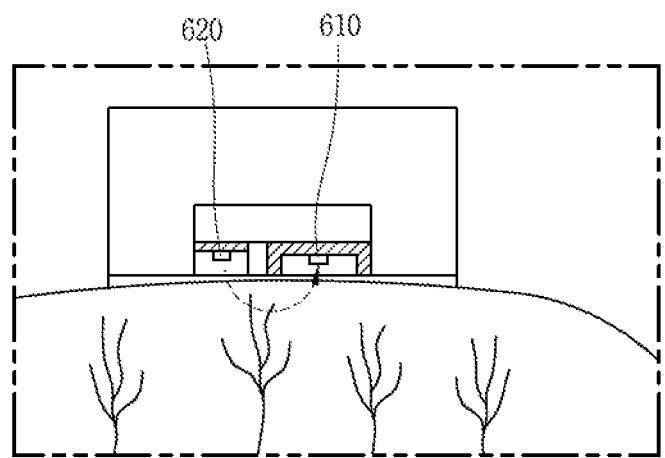
Figure 5C:
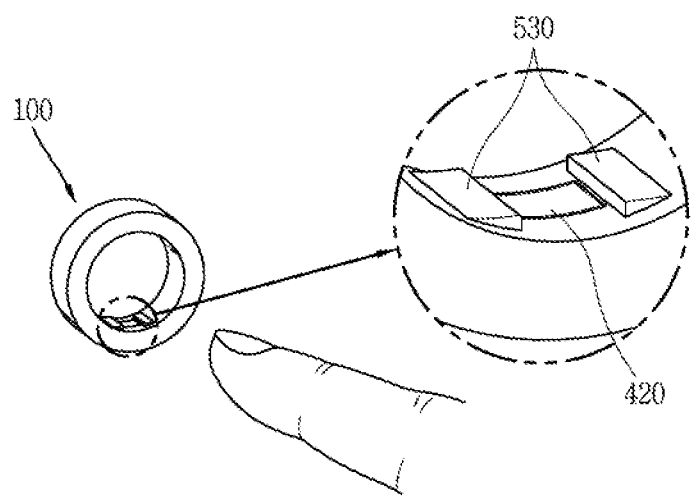

FIGS. 5A to 5C are conceptual views illustrating a ring-type terminal having a guide unit. Hereinafter, a ring-type terminal having a first guide unit which is mechanically movable will be described with reference to FIGS. 5A(a) to 5a(c). As illustrated FIGS. 5A(a) and 5A(b), the first guide unit 510 includes a guide plate 511 on which the second fingerprint sensing module 420 is formed, elastic members 512 which elastically support the guide plate 511, and hinge portions, fixing protrusions 514, and fixing recesses 515 which are formed to allow the guide plate 511 to be rotatable.

The guide plate 511 is formed to be accommodated in an accommodation portion 101*a* which is formed on one region of the inner circumferential surface of the main body. The guide plate 511 may be formed in a rectangular shape but the shape will not be limited to this. One region of the guide plate 511 is supported from the main body 101 by the elastic members 512. The other region of the guide plate 511 is secured with the main body 101 by the hinge portions 512. Also, when an external force is applied to the guide plate 511, the guide plate 511 is rotated centering on the hinge portions 513 so as to be accommodated in the accommodation portion 101*a*.

When the guide plate 511 is accommodated in the accommodation portion 101*a* by the external force, the fixing protrusions 514 protruding from the one region of the guide plate 511 may be fixedly inserted into the fixing recesses 515 which are recessed into the accommodation portion 101*a*.

While the guide plate 511 is in a protruded state from the inner circumferential surface of the main body 101 by a preset angle, if the user's finger is inserted into the insertion region 101', the user may tactilely sense the protruded state of the guide plate 511. Accordingly, the user may consciously contact the finger with the guide plate 511 such that the fingerprint of the finger can be sensed.

Also, the guide plate 511 protrudes to form a tilt surface in a direction that the user's finger is inserted. Hence, when a relatively thin fingertip is inserted into the insertion region 101', the fingertip may more easily contact the second fingerprint sensing module 420.

The first guide unit 510 may be controlled by the controller 180 to be moved. Referring to FIG. 5A(c), the guide plate 511 may keep accommodated in the accommodation portion 101*a* in a standby state that the user's finger has not been inserted into the ring-type terminal 100.

When the insertion of the user's finger into the insertion region 101' is sensed, the controller 180 can control the guide plate 511 to protrude. Here, the insertion of the finger into the insertion region 101' may be sensed by the detection module 144 or the touch sensor 124. Also, the controller 180 can control the guide plate 511 to protrude and simultaneously activate the second fingerprint sensing module 420.

While the guide plate 511 is in the protruded state, the second fingerprint sensing module 420 senses the user's fingerprint. When the finger is inserted into the insertion region 101', the guide plate 511 is accommodated into the accommodation portion 101*a* by an external force applied by the finger and the fixing protrusions 514 are inserted into the fixing recesses 515. That is, the guide plate 511 is controlled to protrude when a fingerprint detection is required and accommodated by an external force, which results in minimizing inconvenience upon wearing the ring-type terminal.

Hereinafter, a ring-type terminal 100 having a second guide unit 520 shape of which is changeable will be described with reference to FIGS. 5B(a) and 5B(b). The second guide unit 520 is provided on at least one region of the inner circumferential surface and formed of electro-active polymer (EAP). Here, the EAP corresponds to a material which causes a change of a shape due to an external electric field. The EAP, for example, may be Inherently Conductive Polymers (ICPS), Inherently dissipative Polymers (IDPS), electroconductive plastics, ionic polymer gel, ionic polymer/metal composite (IPMC), carbon nano-particles contained ICPS, and the like.

The EAP may be a gel type or a film type. Examples of the EAP which is a material to be fabricated into the film type includes at least one of carbon fiber reinforced plastic, fine ceramics and crystallized glass. The carbon fiber reinforced plastic is produced by mixing plastic with carbon fibers so as to create a reinforced material which is intensive and light. Fine ceramics (or new ceramics) may be a magnetic material that a raw material, namely, nitride/carbide which is a naturally or artificially synthesized inorganic compound, is sintered. Also, the crystallized glass is also called glass ceramics, and refers to glass provided with a characteristic, which has not been exhibited before, by crystallizing amorphous glass.

That is, the second guide unit 520 is formed on a region corresponding to the fingerprint sensing module. For example, if the fingerprint sensing module is formed overall along the inner circumferential surface of the main body 101, the second guide unit 520 is preferably formed along the entire inner circumferential surface. The controller 180 controls at least one region of the second guide unit 520 to be changed in shape based on a control signal.

Referring to FIG. 5B(a), the second guide unit 520 is formed in a shape without protruding along the inner circumferential surface of the main body 101. Referring to FIG. 5B(b), the controller 180 can control at least one region of the second guide unit 520 to protrude when the insertion of the user's finger into the insertion region 101' is sensed.

The embodiment illustrates that the first fingerprint sensor 410 is formed along the overall inner circumferential surface of the main body 101. When touch inputs applied by two fingers are sensed by the touch sensor 142, the controller 180 controls one region of the second guide unit 520, which is spaced the farthest away from the touch points, to be changed in shape.

The second guide unit 520 may be formed to protrude from the outer circumferential surface of the main body 101, and accordingly, the touch sensor 142 may also protrude. Therefore, since the second guide unit 520 protrudes while the finger is inserted in the insertion region 101', the finger may more easily contact the touch sensor 124.

Hereinafter, a third guide unit according to another embodiment will be described with reference to FIG. 5C. The ring-type terminal 100 according to this embodiment includes a second fingerprint sensing module 420 which is formed on a part of the inner circumferential surface of the main body 101. The third guide unit 530 is implemented as a pair of guide protrusions which protrude with the second fingerprint sensing module 420 interposed therebetween. The guide protrusions extend along a widthwise direction of the inner circumferential surface.

The user may tactilely sense the guide protrusions. Also, while the user's finger moves in a contact state with the inner circumferential surface, the user's finger may be more closely adhered onto the fingerprint sensing module between the pair of guide protrusions.

Figure 6A:
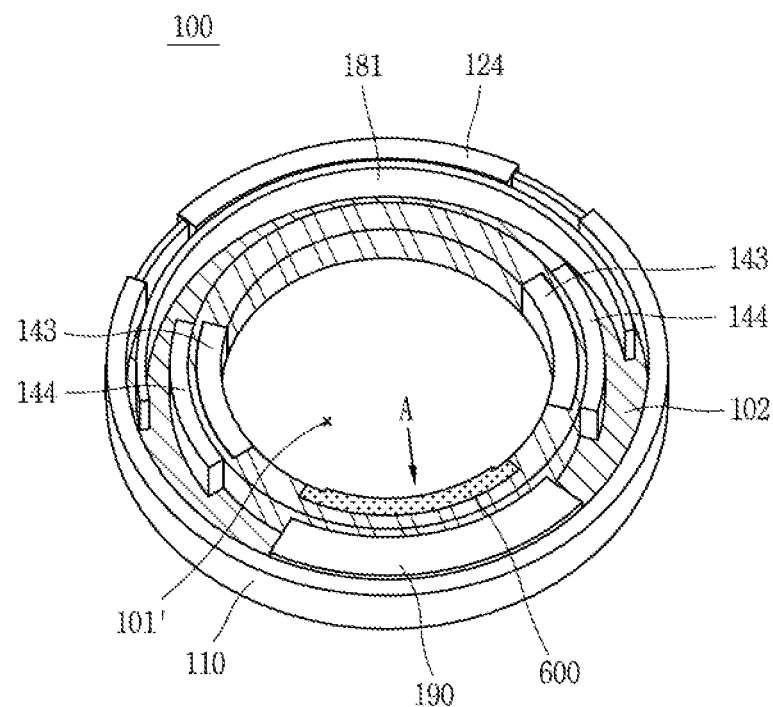
FIGS. 6(a) and 6(b) are conceptual views illustrating a ring-type terminal having a blood flow sensing module in accordance with one embodiment.
Figure 6B:
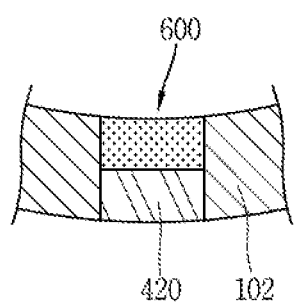

FIG. 6 is a conceptual view illustrating a ring-type terminal having a blood flow sensing module in accordance with one embodiment. As illustrated in FIG. 6(*a*), the ring-type terminal 100 further includes a blood flow sensing module 600 which is formed on the inner circumferential surface of the main body 101. The blood flow sensing module 600 is provided on the frame 102 and located adjacent to the second fingerprint sensing module 420. Referring to FIG. 6(*b*), the second fingerprint sensing module 420 and the blood flow sensing module 600 are located adjacent to the frame 102.

FIG. 6(*c*) is a conceptual view illustrating an operation principle of the blood flow sensing module 600. The blood flow sensing module 600 is provided with a light-receiving portion 610 and a light-emitting portion 620. The light-emitting portion may be implemented as a light-emitting diode (LED). Light emitted from the light-emitting portion 620 transmits a user's skin and is reflected to be incident onto the light-receiving portion 610. Biometric information corresponding to a blood flow rate may be collected based on a quantity and a change of light incident onto the light-receiving portion 610. In more detail, light emitted from the light-emitting portion 620 reaches an artery and a vein through even a lower portion of a subcutaneous tissue. A quantity of light reflected may differ according to an absorption rate within the skin. Accordingly, while the ring-type terminal 100 is worn, the user's biometric information may be collected by emitting light and re-receiving the light.

There is no limit in the number of the light-receiving portion 610 and the number of the light-emitting portion 620. The blood flow sensing module 600 is preferably formed on a region where it can be located close to the user's skin, so as to collect the user's biometric information, sensed by the second fingerprint sensing module 420, and to output data or execute a function based on the user's biometric information.

FIGS. 7A to 7D are conceptual views illustrating a structure of a ring-type terminal with an insertion area, size of which is adjustable. Hereinafter, a ring-type terminal having a main body in an open-loop shape will be described with reference to FIGS. 7A(a) and 7A(b). A ring-type terminal according to this embodiment includes an open-loop frame 102'. The open-loop frame 102' is provided with both ends forming an open region 101" therebetween. The both ends do not come in contact with each other.

The open-loop frame 102' further includes covers 101*b* which are mounted to the both ends, respectively. The covers 101*b* form the appearance of the ring-type terminal 100 along with the case (not illustrated). The covers 101*b* prevents an exposure of an appearance including the frame 102'.

The frame is preferably formed of a metallic material shape of which is changeable by an external force, or an elastic material having a restoring force. Further, the frame is changeable in shape by the external force, and thus electronic components disposed on the frame are also preferably formed of a flexible material. If the ring-type terminal 100 according to this embodiment is provided with a display unit fixed to the frame 102', the display unit is preferably implemented as a flexible display device shape of which is changeable by an external force.

Figure 7A:
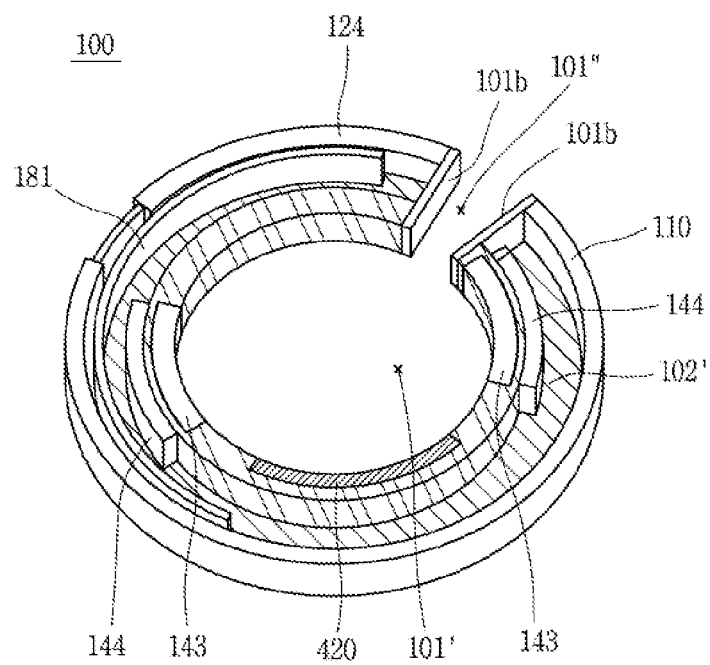
FIGS. 7A(a) to 7D(b) are conceptual views illustrating a structure of a ring-type terminal with an insertion area, size of which is adjustable in accordance with different embodiments.
Figure 7A:
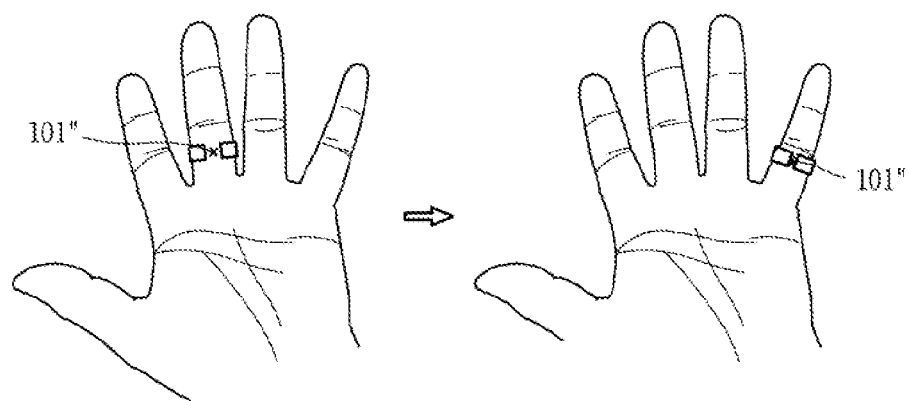

Referring to FIG. 7A(b), when the ring-type terminal 100 is worn on fingers with different thicknesses from each other, a distance between the both ends of the ring-type terminal 100 is variable. According to this embodiment, the ring-type terminal 100 can be adjusted into a size suitable for a finger by an external force, without employing a separate component for changing (varying) the insertion region 101'. Therefore, the ring-type terminal can be stably worn by a plurality of users and on users' every finger.

Hereinafter, a ring-type terminal having a frame provided with an elastic portion will be described with reference to FIGS. 7B(a) to 7B(c). The frame 102 of the ring-type terminal 100 according to this embodiment includes an outer frame 102*a* and an inner frame 102*b*. The outer frame 102*a* and the inner frame 102*b* are coupled to be relatively movable with respect to each other. The outer frame 102*a* is shown having the touch sensor 124, the wireless communication unit 110 and the FPCB 181. The inner frame 102*b* is shown having the fingerprint sensing module 400.

Figure 7B:
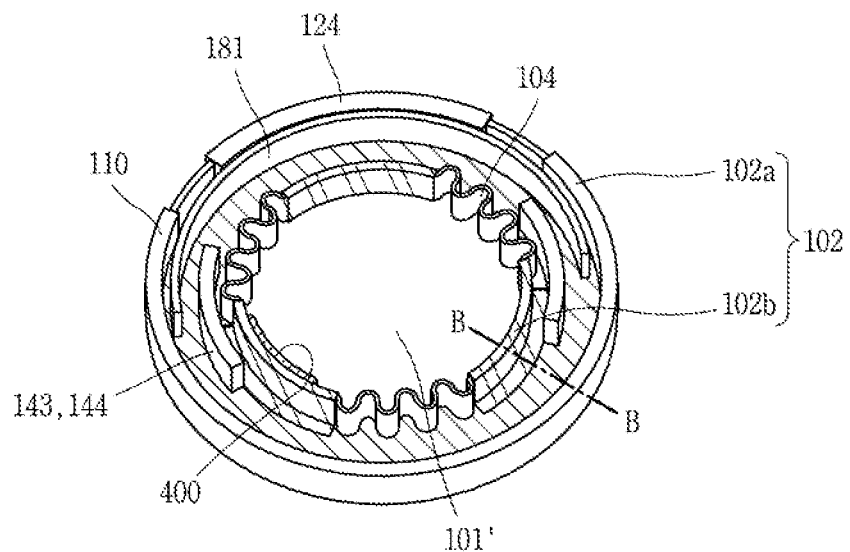
Figure 7B:
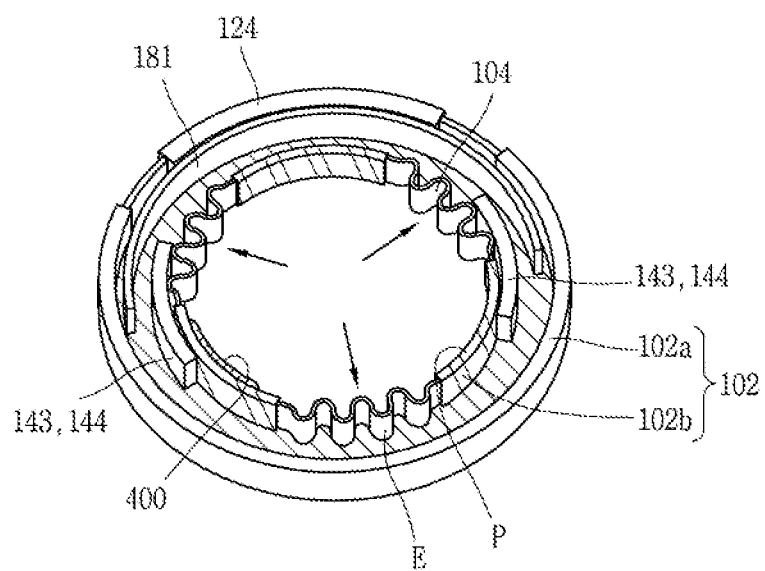
Figure 7B:
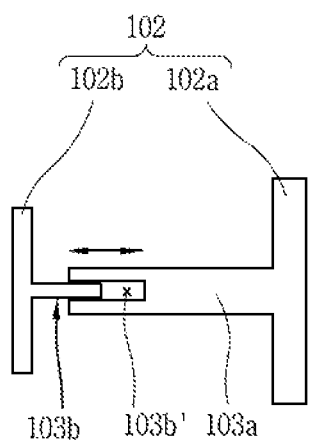

Referring to FIG. 7B(c), the outer frame 102*a* includes a first extending portion 103*a* which extends inward of the ring-type terminal 100, and the inner frame 102*b* includes a second extending portion 103*b* which extends outward of the ring-type terminal 100. The first extending portion 103*a* includes a groove 103*b*' in which one region of the second extending portion 103*b* is accommodated. The outer frame 102*a* and the inner frame 102*b* are relatively movable such that the region of the second extending portion 103*b* accommodated in the groove 103*b*' can vary.

The inner frame 102*b* is provided with at least one elastic portion E and a connecting portion P connecting the at least one elastic portion E. The elastic portion E and the connecting portion P form a closed loop, thereby forming the insertion region 101'. The number and length of the elastic portion E and the connecting portion P may not be limited to the illustrated example.

Also, other components constituting the ring-type terminal 100 according to this embodiment are not limited to those illustrated in the drawings. The ring-type terminal according to this embodiment may include substantially the same components as the components of the ring-type terminal 100 illustrated in FIGS. 4A to 7B(b).

Referring to FIG. 7B(c), the elastic portion E extends by an external force applied from the insertion region 101'. For example, the elastic portion E may be made of an elastic material such as a spring or the like. When the elastic portion E extends, a length of the closed loop increases. Accordingly, the inner frame 102*b* and the outer frame 102*a* move close to each other and the second extending portion 103b is more accommodated in the groove 103b'.

For example, when a finger is inserted into the insertion region 101', pressure is applied to the inner frame 102b due to a thickness of the finger. When a length of the elastic portion E increases accordingly, the insertion region 101' extends. Consequently, without the change of the shape of the outer frame 102a which forms the appearance of the ring-type terminal 100, the inner frame 102b may be changed into a suitable size for the user's finger. Therefore, the user can wear the ring-type terminal on different fingers. Also, since the inner frame of the ring-type terminal is changeable in shape by virtue of the elastic portion, the ring-type terminal 100 can be more stably worn on each finger.

Figure 7C:
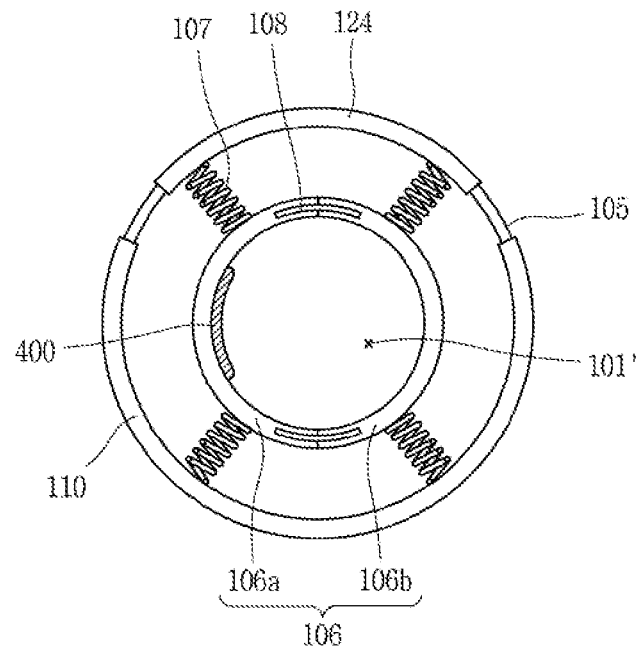
Figure 7C:
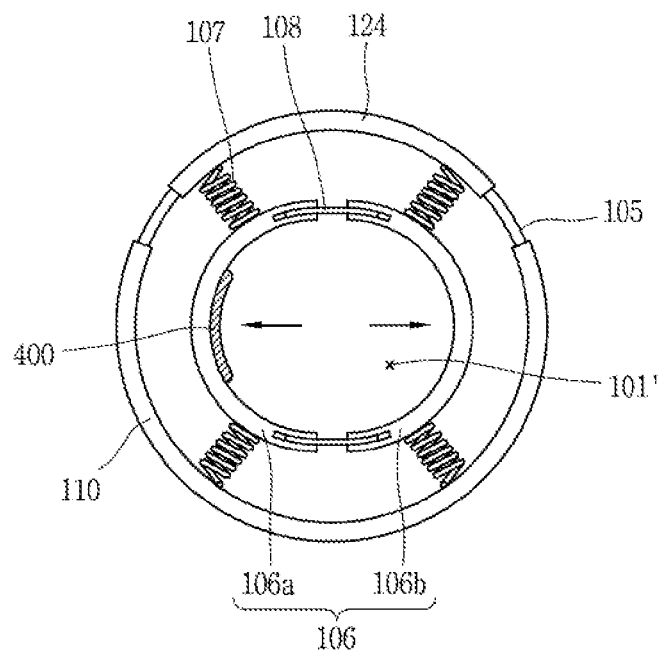

FIG. 7C is a conceptual view illustrating a structure that the insertion region 101' is changed in accordance with another embodiment. The ring-type terminal 100 according to this embodiment includes an outer frame 105, an inner frame 106 and a supporter 107. Electronic components of the ring-type terminal 100 are located between the outer frame 105 and the inner frame 106.

The outer frame 105 and the inner frame 106 are elastically supported by the supporter 107. The outer frame 105 and the inner frame 106 have an annular structure, and do not come in contact with each other. The supporter 107 may be implemented as a plurality of springs.

The inner frame 107 is provided with first and second members 106a and 106b which can be separated from each other. The first and second members 106a and 106b may be supported by separate springs, respectively. The first and second members 106a and 106b are moved close to the outer frame 105 due to an external force which is applied from the insertion region 101' to the inner frame 106. When the first and second members 106a and 106b are moved, a space of the insertion region 101' increases.

The inner frame 106 may further include a plurality of connection members 108 which connect the first and second members 106a and 106b. Each connection member 108 is accommodated in the first and second members 106a and 106b when ends of the first and second members 106a and 106b come in contact with each other, and then exposed when the first and second members 106a and 106b are moved away from each other due to the external force. The connection member 108 may prevent the electronic components, which are accommodated between the outer frame 105 and the inner frame 106, from being externally exposed, and also block an introduction of foreign materials.

According to this embodiment, a periphery of the inner frame surrounding the user's finger may extend by an external force. This may allow the ring-type terminal 100 to be worn on fingers of different thicknesses by virtue of the change of the shape of the inner frame.

Figure 7D:
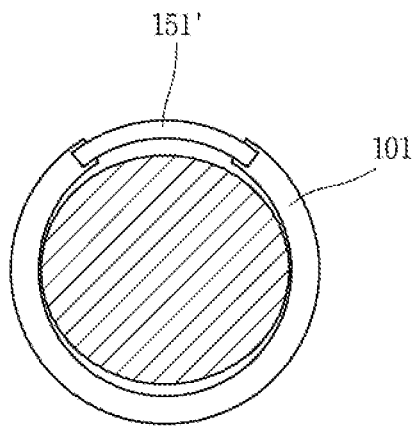
Figure 7D:
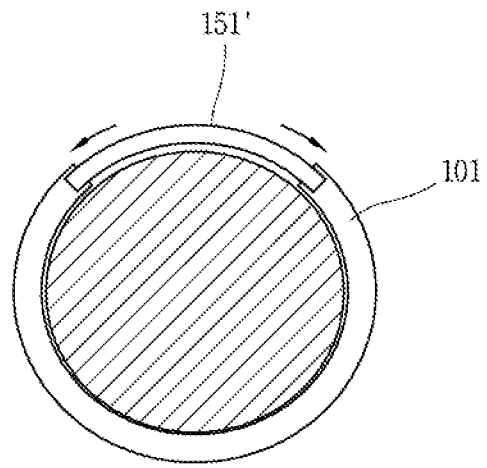

Hereinafter, a ring-type terminal having a flexible display unit will be described with reference to FIGS. 7D(a) to 7D(b). The ring-type terminal 100 according to this embodiment includes an open-loop main body 101, and a flexible display unit 151' which connects both end portions of the open-loop main body 101.

Here, the flexible display unit 151' has a property that it is ready to be restored to an original state by its own elasticity when its shape is changed due to an external force. A substrate, a driving unit, a display panel, a protection film and the like included in the flexible display unit 151' are all formed of flexible materials. For example, the substrate may be formed of plastic, and have a structure that a plastic-based base film is provided and both surfaces thereof are treated by barrier coating. The base film may be implemented with various types of resin, such as polyimide (PI), polycarbonate (PC), polyethyleneterephtalate (PET), polyethersulfone (PES), polyethylenenaphthalate (PEN), fiber reinforced plastic (FRP), and the like. The barrier coating may be performed on surfaces facing each other on a base material, and use an organic or inorganic layer for maintaining flexibility.

That is, the flexible display unit 151' extends in length due to an external force applied from the insertion region 101'. Further, if the flexible display unit 151' is changed in length due to the external force, a graphic image indicating the changed information may be output. This facilitates the user to wear the ring-type terminal on fingers of different thicknesses. Also, since the display unit is changed in size according to the thickness of the finger, an area for receiving a touch input may be adjustable according to the thickness of the finger, thereby preventing an erroneous touch input.

Figure 8A:
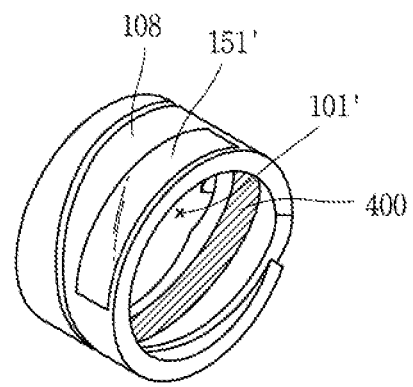
FIGS. 8A(a) to 8B(c) are conceptual views illustrating a ring-type terminal having a variable main body in accordance with different embodiments.
Figure 8A:
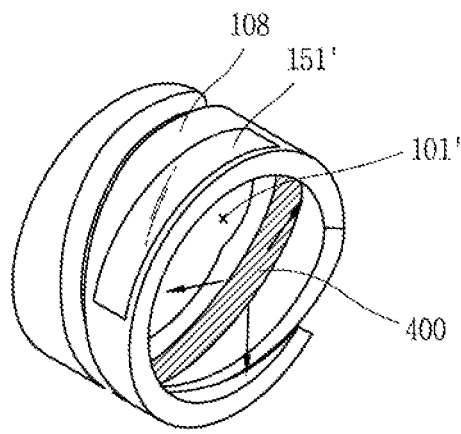
Figure 8B:
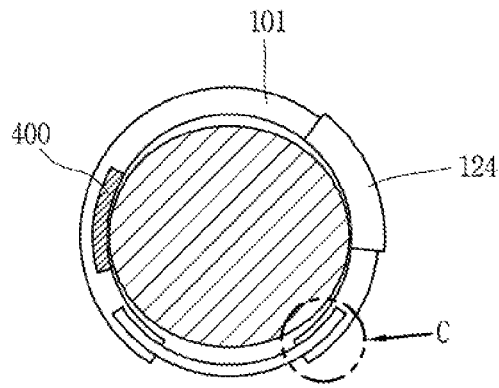
Figure 8B:
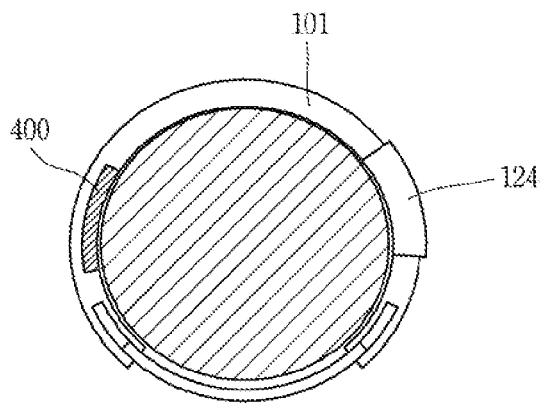
Figure 8B:
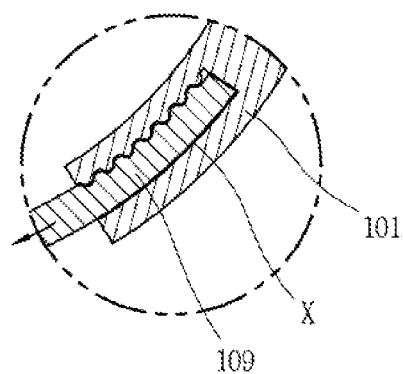

FIGS. 8A and 8B are conceptual views illustrating a ring-type terminal having a variable main body in accordance with another embodiment. Hereinafter, a ring-type terminal having a main body in a spiral shape will be described with reference to FIGS. 8A(a) and 8A(b). A main body 108 of the ring-type terminal 100 according to this embodiment is formed in a spiral shape for surrounding a finger in a turning manner. Both end portions of the main body 108 are spaced apart from each other, and the number of turning based on one of the both end portions may not be limited to the number illustrated in the drawings.

The spiral shape of the main body may be changed as the both end portions are moved by an external force applied from the insertion region 101'. For instance, if a thick finger is inserted into the insertion region 101', the both end portions of the main body are moved, and accordingly the insertion region 101' extends.

The main body 108 is preferably formed of a material which is changed in shape by an external force and has a preset level of elasticity. The main body 108 may be changed in shape such that the insertion region 101' is reduced again by an external force which is applied from the outer circumferential surface to the inner circumferential surface. That is, the ring-type terminal according to this embodiment is configured to vary the insertion region 101' according to a thickness of a finger merely by its main body structure, without a separate shape-changing structure.

Referring to FIGS. 8B(a) to 8B(c), the main body 101 of the ring-type terminal 100 has an open-loop shape forming a disconnection region. The ring-type terminal 100 further includes a connection member 109 to connect both end portions of the main body 101 so as to cover the disconnection region.

Grooves into which both end portions of the connection member 109 are inserted are formed at the both end portions of the main body 101. A saw-toothed shape is formed at each of the both end portions of the connection member 109, and a concave-convex shape is formed in each of the both grooves to be engaged with the saw-toothed shapes, respectively. The connection member 109 inserted in the grooves is prevented from being separated from and moved within the insertion region 101' by virtue of the saw-toothed shape engaged with the concave-convex shape. As the both end portions of the connection member 109 are moved into the grooves, the both end portions of the main body are pulled and thus the insertion region 101' is reduced.

Meanwhile, the main body 101 further includes covers 109' which cover the grooves. If the cover 109' is turned to expose the grooves, the connection member 109 can be separated. This may allow the insertion region 101' to be adjustable by tightening and loosening the connection member 109.

The ring-type terminal 100 according to the various embodiments may generate a different control command according to a fingerprint sensed by the fingerprint sensing module 400. That is, the ring-type terminal 100 may be controlled in a different manner, a wirelessly-connected external device may be selected, or the wirelessly-connected external device may be controlled, based on the fingerprint sensed by the fingerprint sensing module 400. Or, a wirelessly-connected external device may be controlled in a different manner corresponding to the fingerprint. Hereinafter, control methods based on a sensed fingerprint will be described in detail.

FIGS. 9A to 9D are conceptual views illustrating a control method for controlling an external terminal using a ring-type terminal. A ring-type terminal 100 disclosed herein may receive a control command for controlling an external device when it is located at a region adjacent to the external device. For example, the ring-type terminal 100 may carry out wireless communication with the external device at a close distance with the external device. The wireless communication may include a short-range communication module based on an NFC, RFID or Bluetooth low energy (BLE), but a short-range communication mode may not be limited to those.

Figure 9A:
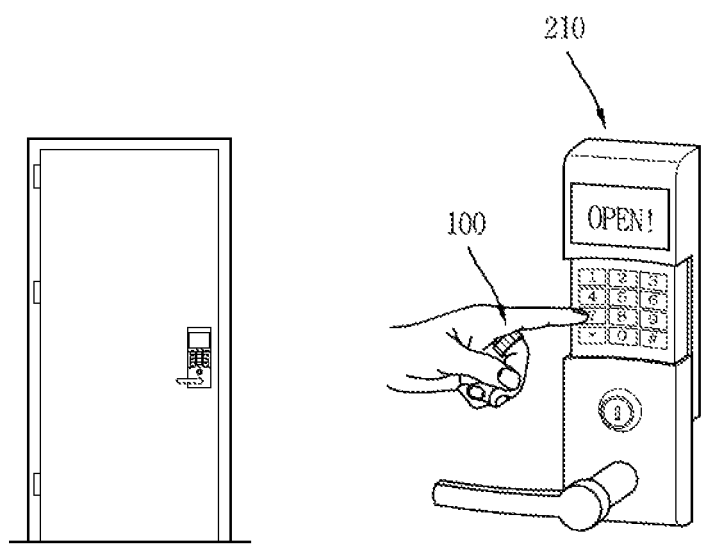
FIGS. 9A to 9d(e) are conceptual views illustrating a control method for controlling an external terminal using a ring-type terminal in accordance with different embodiments.

FIG. 9A illustrates a lock device which is installed on a front door such that the door is open when a password is input. The fingerprint sensing module 400 of the ring-type terminal 100 senses a user's fingerprint. When the ring-type terminal 100 approaches a first external device 210 corresponding to the lock device, the controller 180 controls the wireless communication unit 110 to transmit to the first external device 210 the fingerprint sensed by the fingerprint sensing module 400 and user information corresponding to the fingerprint.

Accordingly, the first external device 210 may compare the received fingerprint and user information with the password, thereby releasing the locked state.

Or, when the sensed user's fingerprint is substantially the same as a reference fingerprint which has been pre-stored to correspond to the first external device 210, the ring-type terminal 100 may control the wireless communication unit 110 to transmit a wireless signal for releasing the locked state. Accordingly, the user may undergo an authentication procedure for releasing the locked state by means of the fingerprint, not by an input of a password.

Figure 9B:
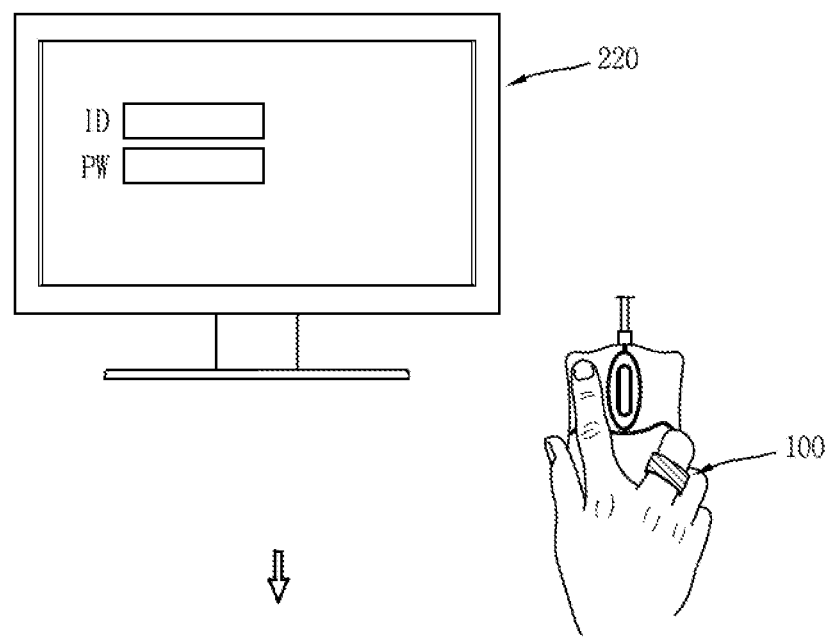
Figure 9B:
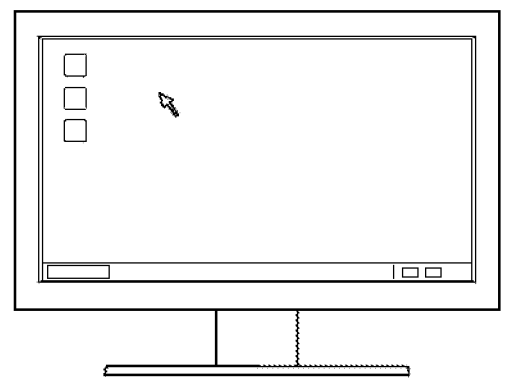

Hereinafter, description will be given of a control method for releasing a locked state of a second external device corresponding to a computer using a ring-type terminal, with reference to FIGS. 9B(a) to 8B(c). The second external device 220 may output screen information for receiving user's ID and password, as a user authentication for use.

The controller 180 transmits to the second external device 220 information related to a fingerprint of a finger on which the ring-type terminal 100 is worn. The second external device 200 releases the locked state when the fingerprint-related information matches pre-stored ID and password.

Figure 9C:
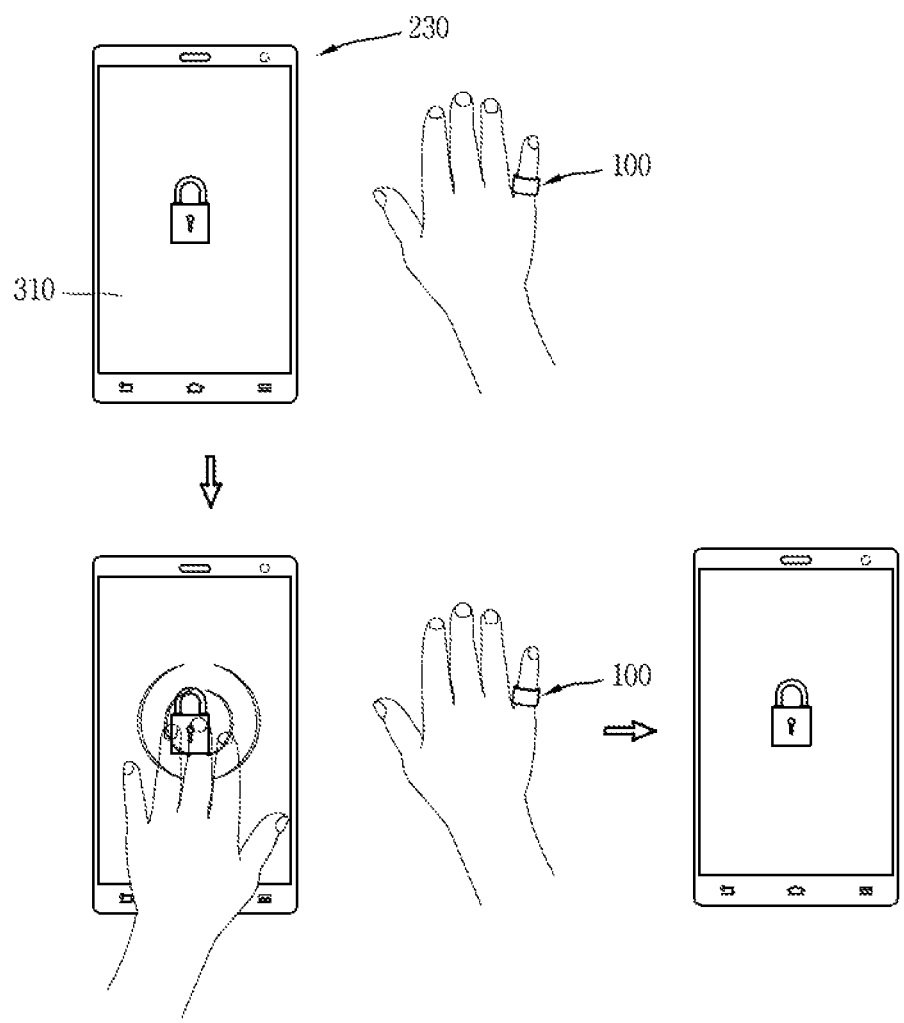

Hereinafter, description will be given of a control method of maintaining a locked state using a ring-type terminal, with reference to FIG. 9C. FIG. 9C illustrates that a third external device 230 corresponding to a mobile terminal is maintained in a locked state, and a display module of the third external device 230 is outputting a lock screen 310. For example, the ring-type terminal 100 may be a state of being worn on a fifth finger.

When the ring-type terminal 100 is worn on the fifth finger, the controller 180 can transmit a control signal for controlling the third external device 230 to remain in the locked state.

Even though receiving a user's touch input applied to the lock screen 310 for releasing the locked state, the mobile terminal maintains its locked state based on the control signal received from the ring-type terminal 100. That is, top priority is put on the control signal received from the ring-type terminal 100. This may allow the user to wear the ring-type terminal 100 on a finger which is designated for maintaining the locked state of the mobile terminal.

That is, the ring-type terminal 100 disclosed herein controls an external device based on a sensed fingerprint. The ring-type terminal 100 may transmit the fingerprint-related information (user information, or information related to the user's hand and finger) to the external device. Also, the external device may output the finger-related information so as to provide the user with information related to a finger with the ring-type terminal 100 worn thereon. Hereinafter, description will be given in detail of an embodiment that the ring-type terminal 100 interoperates (interworks, cooperates) with the mobile terminal, namely, a control method for outputting the information.

Hereinafter, a control method for releasing a lock state of a mobile terminal using a ring-type terminal will be described with reference to FIGS. 9D(a) to 9D(e).

Figure 9D:
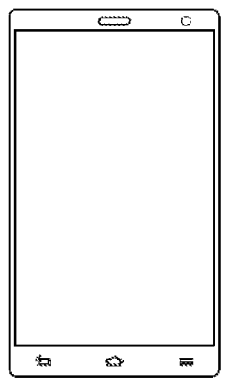
Figure 9D:
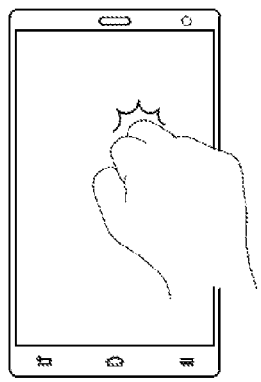
Figure 9D:
Figure 9D:
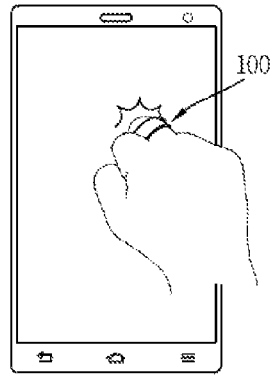
Figure 9D:

Referring to FIGS. 9D(a), 9D(b) and 9D(c), in an inactive state of the display module of the mobile terminal 230, the display module is activated in response to a knock applied thereto. That is, the mobile terminal 230 disclosed herein is provided with a sensor (not illustrated) which senses the knock. For example, the display module may activate a guest mode of the mobile terminal 230.

Referring to FIGS. 9D(a), 9D(d) and 9D(e), while the ring-type terminal 100 is worn on a preset finger of the user, if a fingerprint of the preset finger is sensed by the fingerprint sensing module, the controller may transmit a wireless signal to the mobile terminal 230. When the knock is applied to the mobile terminal 230 by the user's hand with the ring-type terminal 100 worn, the mobile terminal 230 activates the display module based on the wireless signal and the knock. The mobile terminal 230 enters a user mode accordingly. That is, the mobile terminal is activated into a different mode according to a reception or non-reception of the wireless signal from the ring-type terminal 100.

Here, the display module of the mobile terminal 230 according to this embodiment may not be limited to the inactive state. While the display module outputs a lock screen, the mobile terminal may convert the lock screen, when a preset knock pattern is applied or when the wireless signal is received from the ring-type terminal 100 inserted into the preset finger or the knock applied by such ring-type terminal 100 is sensed, for releasing the lock state of the mobile terminal.

Accordingly, the user may convert the mobile terminal into a different mode and release the lock state of the mobile terminal using the ring-type terminal.

FIGS. 10A to 10F are conceptual views illustrating a control method for a ring-type terminal interoperable with a mobile terminal. The controller 180 can determine a user who is wearing the ring-type terminal 100 and a user's finger with the ring-type terminal 100 worn thereon by means of the fingerprint sensing module 400. The ring-type terminal 100 may transmit a control command input by the user to the mobile terminal 230 and the mobile terminal 230 may control other external devices based on the control command. The mobile terminal 230 and the ring-type terminal 100 may include BLE-based short-range communication modules, respectively, for communication therebetween.

The controller 180 transmits a control signal to the mobile terminal 230 based on the information related to the user and the user's finger. The controller 180 can control the wireless communication unit 110 to transmit both user-related information and finger-related information to the mobile terminal 230 based on the fingerprint sensed by the fingerprint sensing module 400. The mobile terminal 230 may generate a control command and control the external device based on the control signal. Or, the mobile terminal 230 may activate a user input unit for receiving a control command for the control of the external device.

Figure 10A:
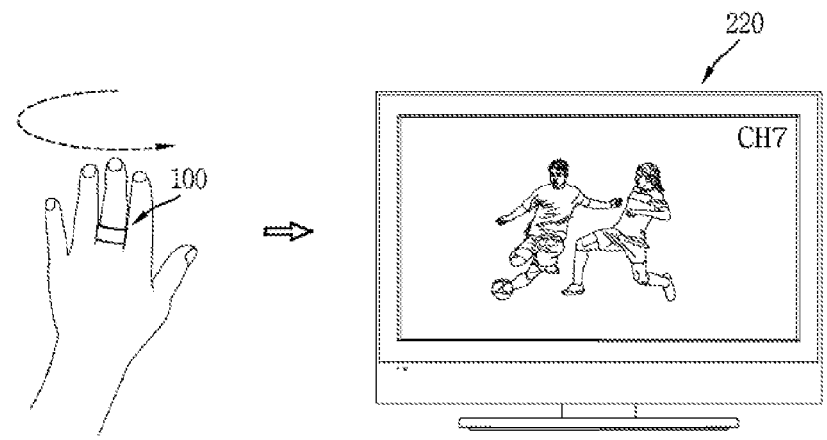
FIGS. 10A(a) to 10F(c) are conceptual views illustrating a control method for a ring-type terminal interoperable with a mobile terminal.
Figure 10A:
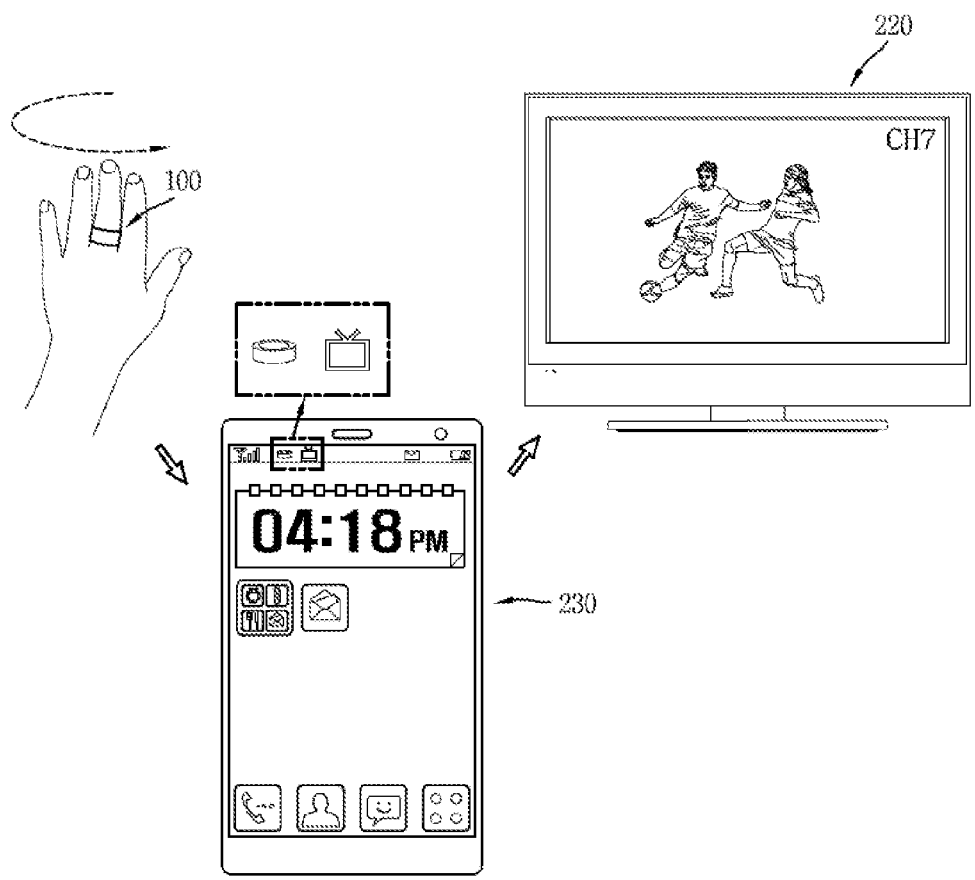

Referring to FIG. 10A(a), the ring-type terminal 100 may control the wireless communication unit 110 to transmit a control signal, which is generated by the ring-type terminal 100, to a preset second external device 220. The second external device 220 may correspond to a plurality of preset devices, and the controller may selectively transmit the control signal to the plurality of devices.

Referring to FIG. 10A(b), the controller 180 can transmit a control signal, which is generated by the ring-type terminal 100, to the mobile terminal 230. The mobile terminal 230 may control the second external device 220 by transferring the control signal to the second external device 220. For example, the ring-type terminal 100 may generate a specific control signal. The mobile terminal 230 may then convert the control signal into a control command appropriate for the external device, which is wirelessly connected to the mobile terminal 230, and transfer the converted control command to the second external device 220. In addition, the display module of the mobile terminal may provide a select window for requesting for checking the control command or selecting some devices to control from a plurality of external devices.

Figure 10B:
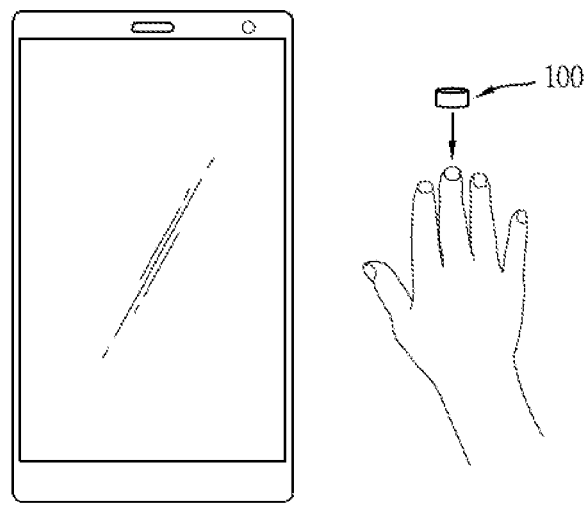
Figure 10B:
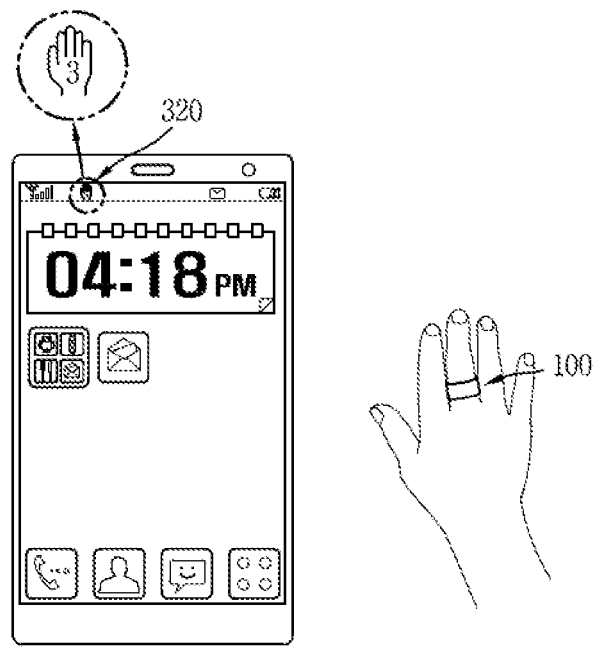

Referring to FIGS. 10B(a) and 10B(b), when the ring-type terminal 100 is worn on the user's finger, the fingerprint sensing module 400 senses a fingerprint of the finger with the ring-type terminal 100 worn thereon. The controller 180 controls the wireless communication unit 110 to transmit information related to the fingerprint of the finger to the mobile terminal 230. Here, the fingerprint-related information may include information related to the user who is wearing the ring-type terminal 100 and information related to the finger with the ring-type terminal 100 worn thereon.

The display module of the mobile terminal 230 outputs a graphic image 320 indicating the finger-related information. The graphic image 320 may be output on an indicator region on which alarm information and operation information are output on the display module.

For example, if the finger is the third finger corresponding to the middle finger, the graphic image 320 may be implemented into a hand image with a number "3." Accordingly, the user can recognize the finger on which the ring-type terminal 100 wirelessly communicating with the mobile terminal 230 has been worn, thereby deciding a control method using the hand with the ring-type terminal worn.

Hereinafter, description will be given of a method for controlling a mobile terminal based on a finger on which a ring-type terminal is worn, with reference to FIGS. 10C(a) to 10C(c). FIG. 10C(a) illustrates the display module in an inactive state. When the fingerprint sensing module 400 senses that the ring-type terminal has been worn on the first finger corresponding to the thumb, the controller 180 controls the display module to output the graphic image 320 indicating the first finger.

Also, the display module of the mobile terminal outputs first screen information 330 corresponding to the first finger. For example, the first screen information 330 may include an icon corresponding to at least one application. The application may be set by a user or correspond to an application classified into a specific category.

Referring to FIG. 10C(c), the mobile terminal may activate a preset mode when the ring-type terminal 100 is worn on a specific finger. For example, if the ring-type terminal 100 is worn on the fifth finger corresponding to the little finger, the mobile terminal activates a sleep mode. Here, in response to the activation of the sleep mode, an output of an alarm of an application may be restricted or a function of sensing a sleeping state of a user may be activated. That is, the mobile terminal may be controlled to be in the sleep mode while the ring-type terminal is worn on the fifth finger.

According to this embodiment, the user may control the mobile terminal to execute a preset function by identifying (recognizing) a finger on which the ring-type terminal is worn. Also, the controller may control a preset function to be activated in a different manner according to the identified finger. For example, a memo application for controlling an input and a storage of text may be run, respectively, if the ring-type terminal 100 is worn on first and second fingers. If the ring-type terminal 100 is worn on the second finger, the display module may be controlled to receive a touch input for inputting the text. Or, if the ring-type terminal 100 is worn on the first finger, the microphone 122 may be activated to receive a user's voice for inputting the text.

Or, when the function is executed, the setting of the mobile terminal may be changed. For example, when the ring-type terminal is worn on the first finger, the setting of the mobile terminal may be changed to output an alarm with respect to a reception of a preset event into audible data. Also, when the ring-type terminal is worn on the fifth finger, the setting may be changed to restrict an output of the alarm with respect to the event reception.

Hereinafter, description will be given of a control method of a ring-type terminal for applying a control command to an external device using a mobile terminal, with reference to FIGS. 10D(a) and 10D(b). According to this embodiment, the mobile terminal may be utilized as a control device for an external device, by use of the ring-type terminal.

Figure 10D:
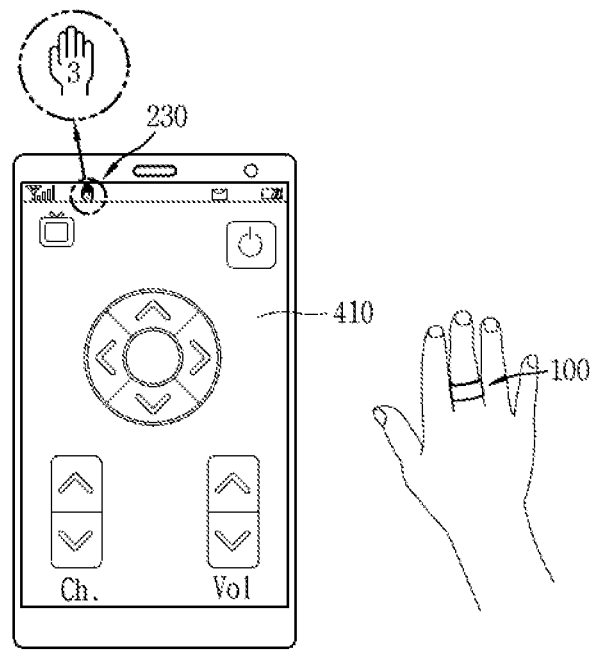
Figure 10D:
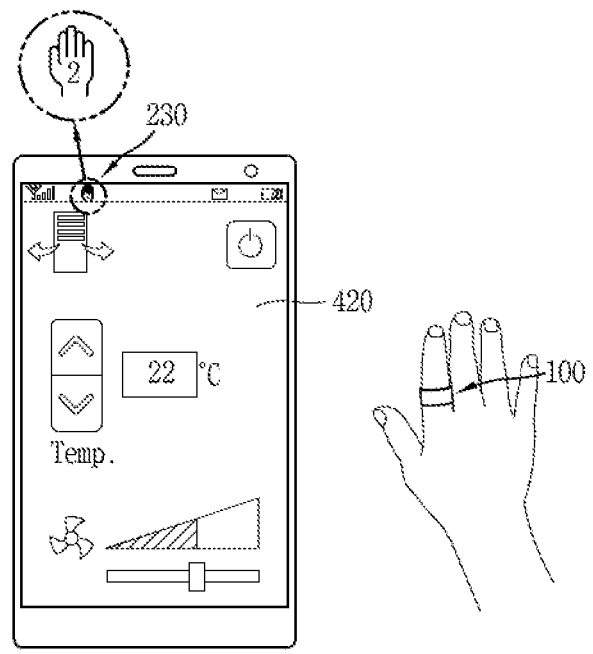

Referring to FIG. 10D(a), the controller 180 controls the fingerprint sensing module to sense that the ring-type terminal has been worn on a third finger corresponding to the middle finger, and transmits a control signal, which includes the finger-related information, to the mobile terminal.

The mobile terminal outputs the graphic image 320, which indicates the third finger, on the display module based on the control signal. Also, the mobile terminal outputs a first control screen 410 of an external device, which corresponds to the third finger, on the display module. For example, the external device corresponding to the third finger may be a TV. The first control screen 410 may receive a user's touch input for controlling the external device. Or, the user may generate a control command for controlling the external device using a gesture of a hand where the ring-type terminal 100 is worn.

Meanwhile, referring to FIG. 10D(b), when the ring-type terminal 100 is worn on the second finger corresponding to the forefinger, the graphic image 320 indicating the second finger is output on the display module of the mobile terminal. Also, the mobile terminal outputs a second control screen 420 of an external device corresponding to the second finger on the display module. For example, the external device corresponding to the second control screen 420 may be an air conditioner. The user may control the external device by applying a touch input to the second control screen 420 or based on a gesture. That is, the ring-type terminal 100 may be provided with a control screen for controlling an external device corresponding to each finger from the mobile terminal, based on the sensed fingerprint.

Figure 10E:
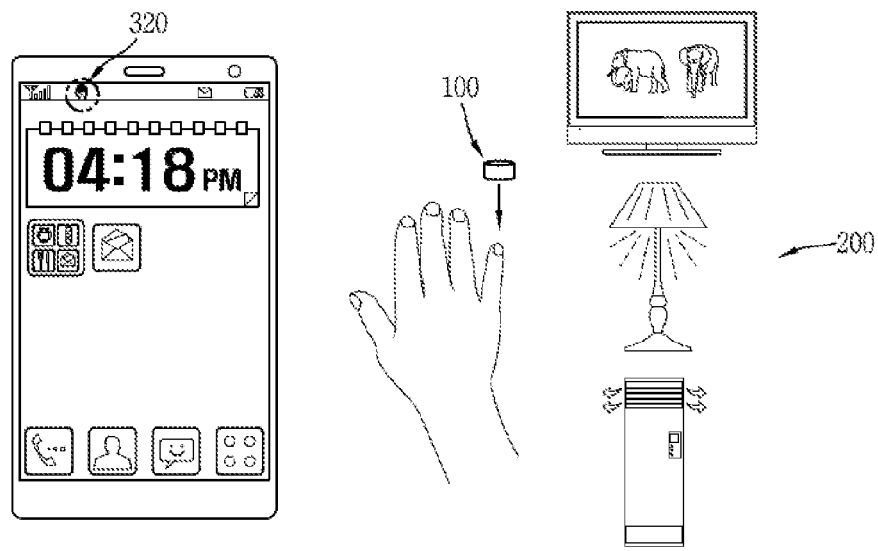
Figure 10E:
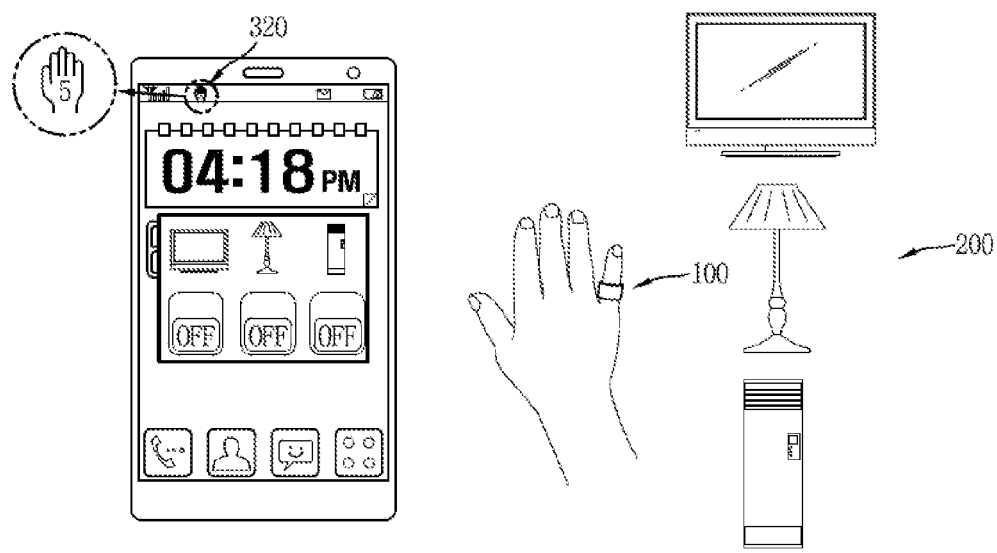

Hereinafter, description will be given of a method for controlling a plurality of external devices using a ring-type terminal. Referring to FIG. 10E(a), operation states of a plurality of external devices are illustrated. When the ring-type terminal 100 is worn on the fifth finger corresponding to the little finger, a control command for converting states of the plurality of devices into an inactive state may be transmitted.

Here, the plurality of devices corresponding to the respective fingers may be designated or changed by user's settings. That is, the user may set a target device to be controlled to correspond to a fingerprint of each finger. A method of setting a target device will be described in detail later with reference to FIGS. 16A to 16C.

Also, the display module of the mobile terminal outputs the graphic image 320 indicating the fifth finger. Also, the display module of the mobile terminal outputs a notification window 340 notifying that the plurality of devices have been converted into the inactive state. The notification window 340 may include a plurality of icons for controlling the external devices. The external devices may also be controlled based on the user's touch input.

That is, when the ring-type terminal wirelessly communicates with a plurality of external devices, if the ring-type terminal is worn on a preset finger, substantially the same control command may be transmitted to each of the plurality of external devices. Accordingly, the user can control the plurality of devices at once.

Here, the control signal may be transferred from the ring-type terminal 100 directly to the plurality of external devices. Of course, the control signal may be transmitted to the mobile terminal, and then transferred from the mobile terminal to the plurality of external devices.

Hereinafter, description will be given of a control method in case where a fingerprint sensed by the fingerprint sensing module 400 does not match a pre-stored user's fingerprint, with reference to FIGS. 10F(a) to 10F(c). As aforementioned, the controller 180 compares the fingerprint sensed by the fingerprint sensing module 400 with a pre-stored or preset user's fingerprint image. If the fingerprint and the fingerprint image match each other, the mobile terminal may output the graphic image 320 indicating the user's finger and control the plurality of external devices.

Figure 10F:
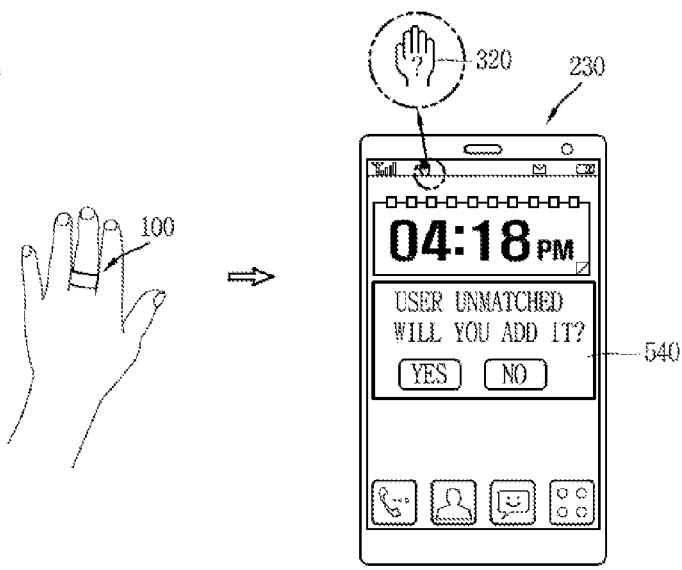
Figure 10F:
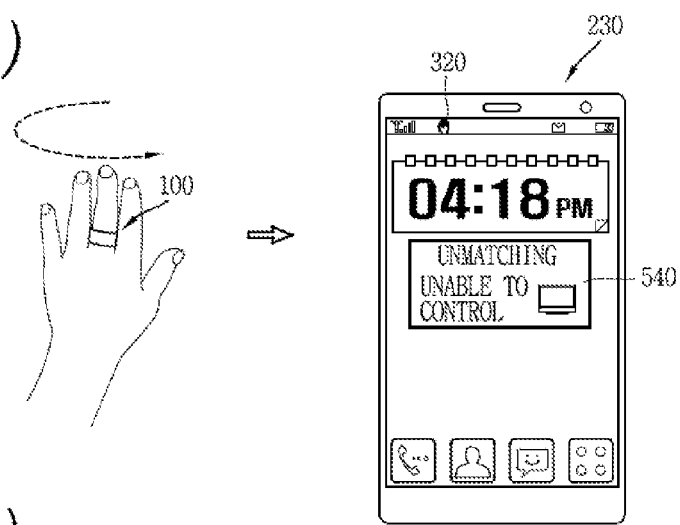
Figure 10F:
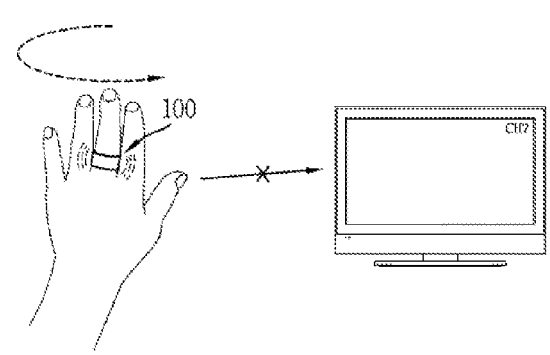

Referring to FIG. 10F(a), if the fingerprint sensed by the fingerprint sensing module 400 is different from the pre-stored fingerprint image, the mobile terminal outputs a notification window 540 including such related information to the display module. Also, the notification window 540 may include information for checking whether or not to add the currently-sensed fingerprint as a fingerprint of another user. Also, the graphic image 320 may include information indicating that it is impossible to identify who has the currently-sensed fingerprint.

FIG. 10F(b) illustrates a state that a control command is generated by the ring-type terminal 100 when the finger sensed by the fingerprint sensing module 400 is different from the fingerprint image. Upon reception of the control command and the fingerprint-related information, the mobile terminal 100 outputs the notification window 540 to the display module to indicate that the fingerprint and the fingerprint image do not match each other. Also, the notification window 540 may include information indicating that it is impossible to control the preset external device.

Referring to FIG. 10F(c), when the fingerprint image is different from the fingerprint sensed by the fingerprint sensing module 400, if the control command is generated by the ring-type terminal 100, the controller 180 outputs an alert notification to notify that the external device cannot be controlled by the control command. For example, the controller may control the haptic module to output vibration as the alert notification. Accordingly, the user wearing the ring-type terminal 100 may recognize that the external device cannot be controlled.

Figure 11A:
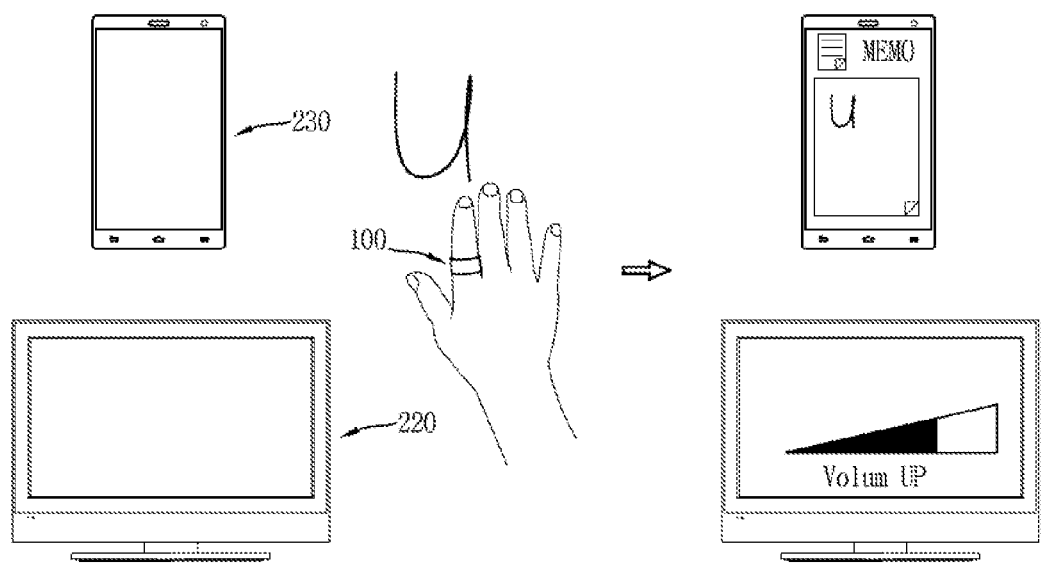
FIGS. 11A to 11B(b) are conceptual views illustrating a method for controlling a plurality of external devices using a ring-type terminal in accordance with different embodiments.
Figure 11B:
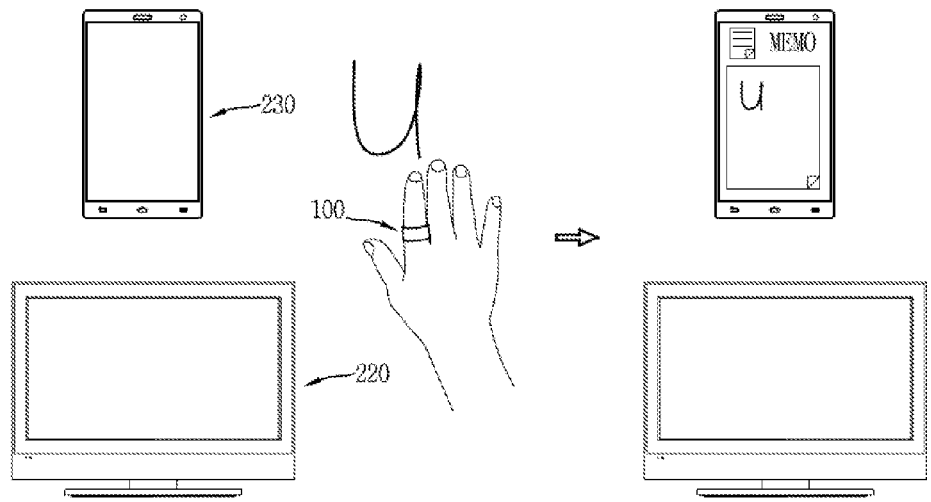
Figure 11B:
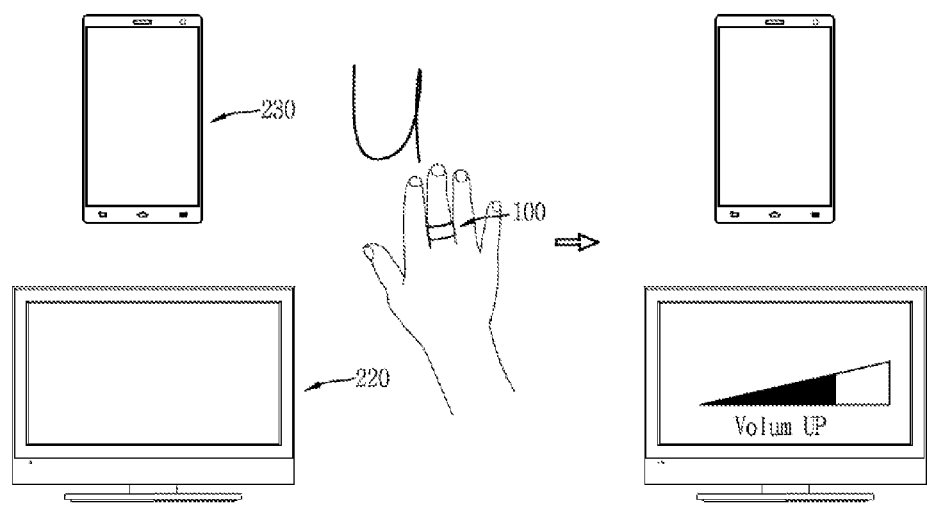

FIGS. 11A and 11B are conceptual views illustrating a method for controlling a plurality of external devices using a ring-type terminal. The ring-type terminal 100 according to this embodiment may further include a sensor for generating a user gesture signal by sensing a movement. The sensor may be implemented as a gyro sensor, an acceleration sensor and the like. The external device may be controlled based on the gesture signal.

Hereinafter, description will be given of a control method for transmitting different control commands to external devices based on one gesture signal, with reference to FIG. 11A. The ring-type terminal 100 wirelessly communicates with second and third external devices 220 and 230, and generates a gesture signal based on a movement of a hand on which the ring-type terminal 100 is worn.

When the gesture signal is applied to the second external device 220, it may be implemented as a control command for increasing a volume level of sound output from an audio output module. Also, when the gesture signal is applied to the third external device 230, it may be implemented as a control command for outputting text corresponding to the movement.

That is, when the ring-type terminal 100 is wirelessly connected to a plurality of external devices, the external devices are controlled in different manners based on one gesture. In addition, if it is impossible to control one external device based on the gesture signal, the external device may output alert information. Here, the plurality of external devices may recognize the corresponding gesture as a command according to a pattern of one input gesture.

If the input gesture pattern is different from a pre-stored gesture pattern, the external device may not accept the corresponding gesture as a command.

Hereinafter, description will be given of a control command for controlling one of a plurality of external devices, with reference to FIGS. 11B(a) and 11B(b). The ring-type terminal 100 according to this embodiment wirelessly communicates with second and third external devices 220 and 230.

FIG. 11B(a) illustrates that the ring-type terminal 100 is worn on the second finger, and FIG. 11B(b) illustrates that the ring-type terminal 100 is worn on the third finger. When one gesture is sensed by the gesture sensor of the ring-type terminal 100, if the ring-type terminal 100 is worn on the second finger, a control command applied to the third external device 230 is generated and a control command applied to the second external device 220 is not generated.

Meanwhile, when the ring-type terminal 100 is worn on the third finger, a control command applied to the second external device 220 is generated and a control command applied to the third external device 230 is not generated. That is, when wirelessly communicating with a plurality of external devices, an external device to be controlled may be decided according to a finger on which the ring-type terminal is worn, and the user can control only the external device corresponding to the finger, among the plurality of external devices.

The foregoing embodiment has illustrated that control information according to finger-related information and a control command is output through a mobile terminal. However, such information may also be provided through an output unit of an external device, other than the mobile terminal. Also, while the ring-type terminal 100 is worn on a specific finger, the external device receives the finger-related information and a control command applied by the user through the ring-type terminal 100. Hereinafter, description will be given in detail of controlling an external device based on a control command received through the ring-type terminal 100.

Figure 12A:
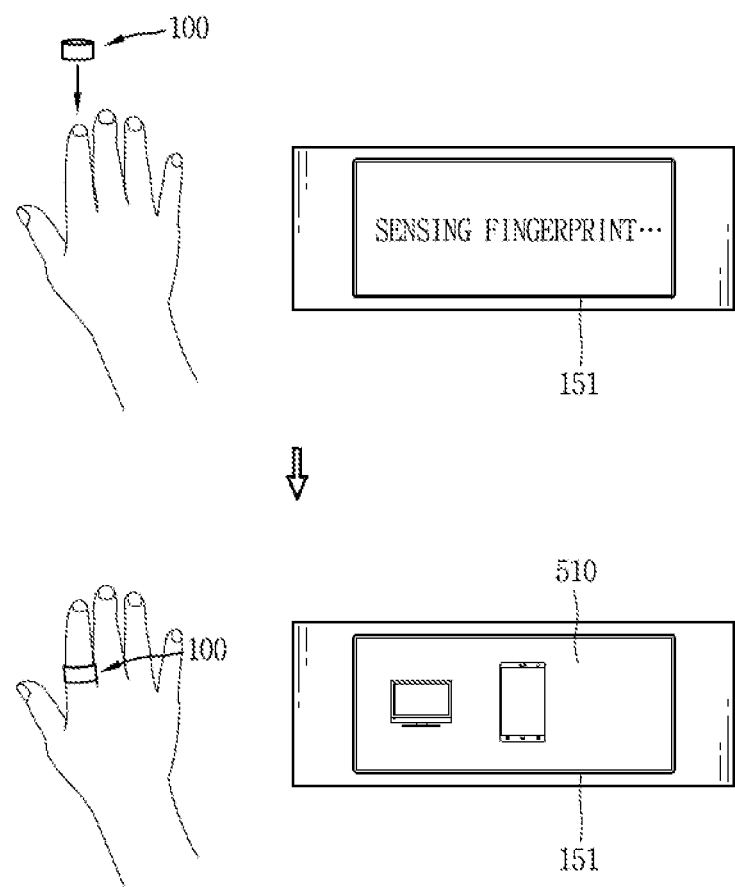
FIGS. 12A and 12B are conceptual views illustrating a control method for executing a function corresponding to a detected fingerprint in accordance with different embodiments.
Figure 12B:
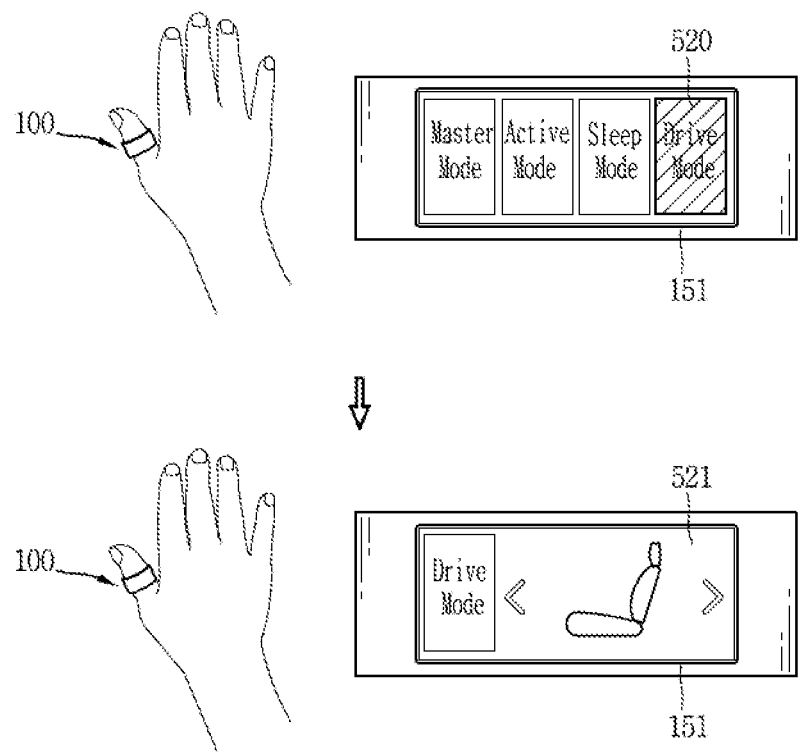

FIGS. 12A and 12B are conceptual views illustrating a control method for executing a function corresponding to a sensed fingerprint. The ring-type terminal 100 according to this embodiment includes a display unit 151 formed on at least one region of an outer circumferential surface thereof. Referring to FIG. 12A, if a fingerprint is sensed by the fingerprint sensing module 400, the controller 180 controls the display unit 151 to output first screen information 510 including an icon corresponding to an external device, which has been set to be controlled in correspondence with the fingerprint.

Hereinafter, description will be given of a control method for setting a mode corresponding to a finger, with reference to FIG. 12B. When a fingerprint of a finger is sensed, a mode which has been set to correspond to the finger is activated. Also, the display unit outputs second screen information 520 to indicate that the mode corresponding to the finger has been activated among a plurality of modes.

For example, when the ring-type terminal 100 is worn on the first finger corresponding to the thumb, the controller 180 activates a drive mode. Also, the controller 180 controls the display unit 151 to output a control image 521 for transmitting a control command to a vehicle in the drive mode. Also, in the drive mode, the mobile terminal 230 may be set to display a navigation screen including current position and destination information and activate a microphone for receiving a user's voice command. When the drive mode is activated, a test-to-speech (TTS) function of the mobile terminal may be activated.

In an active mode, the mobile terminal may control in advance external devices located adjacent thereto to be in a standby state in which the external devices can receive a control signal. Also, in the active mode, the mobile terminal may receive in advance information related to the control states of the external devices and provide the received information to the user. According to this embodiment, an external device desired to control or an active mode is automatically turned on based on a type of finger on which the ring-type terminal is worn.

The ring-type terminal according to this embodiment may not be provided with a display unit. For example, the ring-type terminal 100 may use another output module, other than the display unit, for storing a fingerprint and setting the fingerprint-associated function. For example, the step of storing the fingerprint and setting the related function may be guided to be executed based on sound and light output from the audio output module and the light-emitting portion of the ring-type terminal 100.

The foregoing embodiment has exemplarily illustrated the control method of the terminal based on a distinguishable control command in a different mode activated in the ring-type terminal worn on a different finger. In accordance with one embodiment, when the ring-type terminal 100 is worn on different fingers and generates substantially the same control command (for example, the same gesture is input), distinguishable functions may be activated. Hereinafter, it will be described in detail with reference to FIG. 13.

Figure 13:
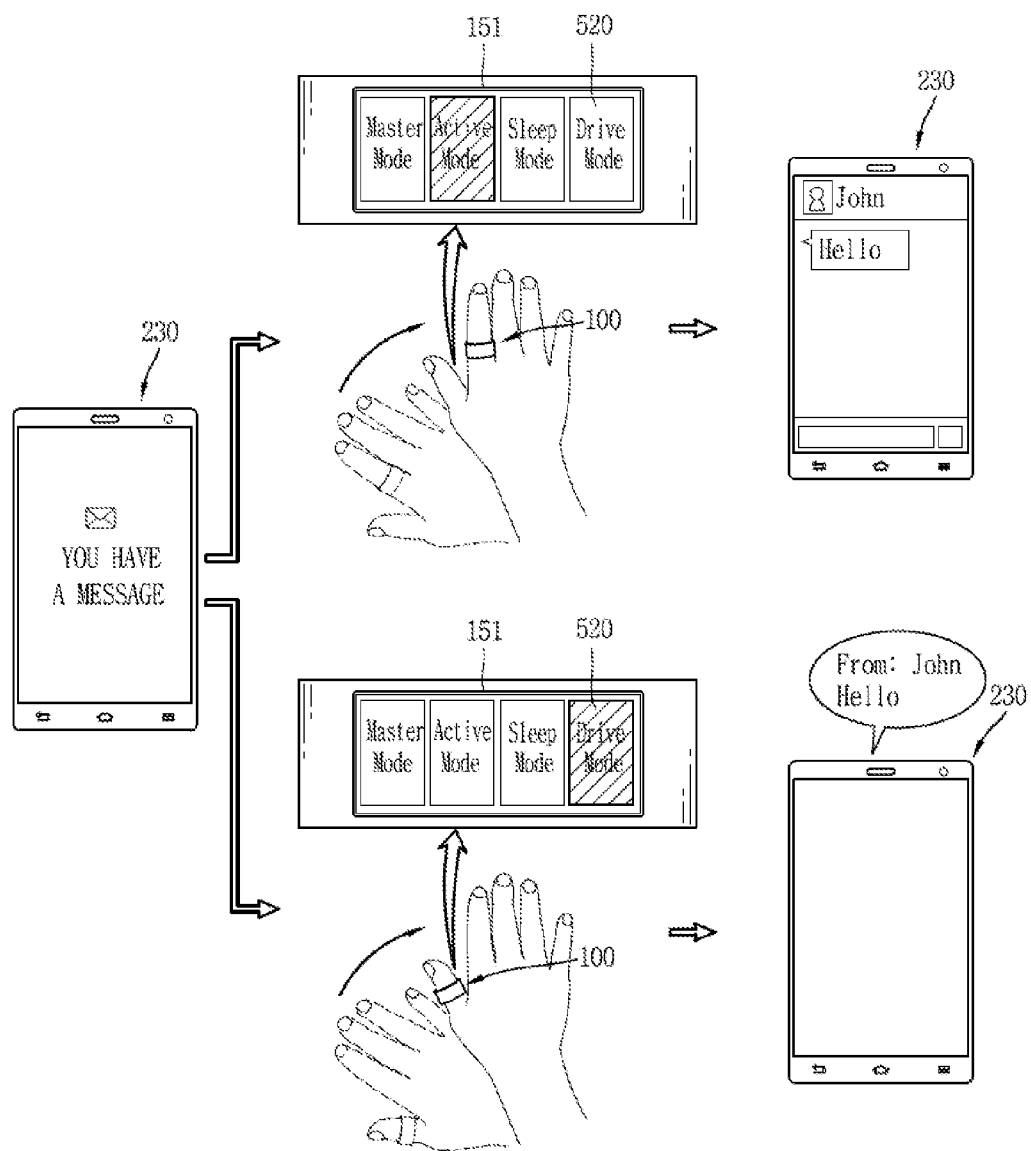
FIG. 13 is a conceptual view illustrating a control method for a mobile terminal by a ring-type terminal worn on a different finger in accordance with one embodiment.

FIG. 13 is a conceptual view illustrating a control method for a mobile terminal by a ring-type terminal worn on different fingers. According to this embodiment, the controller 180 activates a different mode based on a finger on which the ring-type terminal 100 is worn. For example, when the ring-type terminal 100 is worn on the second finger, the controller 180 activates the active mode. Also, when the ring-type terminal 100 is worn on the first finger, the controller 180 activates the drive mode.

The controller 180 executes a different mode based on each finger and generates a different control command based on a gesture signal generated in response to a movement of the hand. For example, the ring-type terminal 100 wirelessly communicates with the mobile terminal 230. When a message is received in the mobile terminal 230, a gesture signal is generated by the ring-type terminal 100.

When the ring-type terminal 100 is worn on the second finger, the active mode is run, and a first control command for outputting contents of the message is generated based on the gesture signal. Meanwhile, when the ring-type terminal 100 is worn on the fifth finger, the drive mode is activated and a second control command for outputting the contents of the message into a format of audible voice is generated based on the gesture signal.

That is, a different control command is generated in a different mode based on substantially the same gesture signal. Accordingly, the mobile terminal may be controlled in different manners in different modes which differ based on the fingers.

According to this embodiment, the ring-type terminal 100 senses the gesture signal which is generated when the finger is fully stretched, but the present invention may not be limited to this. The ring-type terminal may sense a gesture applied while the user folds a part of a finger. Referring to FIG. 3A, a shape of a hand gesture may be sensed based on a touch input applied to the touch sensor 124 formed on the outer circumferential surface.

FIGS. 14A to 14D illustrate a control method for restricting the control of an external device based on a mounting (wearing) position of a ring-type terminal. The ring-type terminal 100 disclosed herein may be divided into a front region and a rear region based on the fingerprint sensing module 400, the display unit 151 and the like. For example, a region where the display unit 151 is disposed may be defined as the front region, and a region corresponding to the fingerprint sensing module 400 may be defined as the rear region.

Figure 14A:
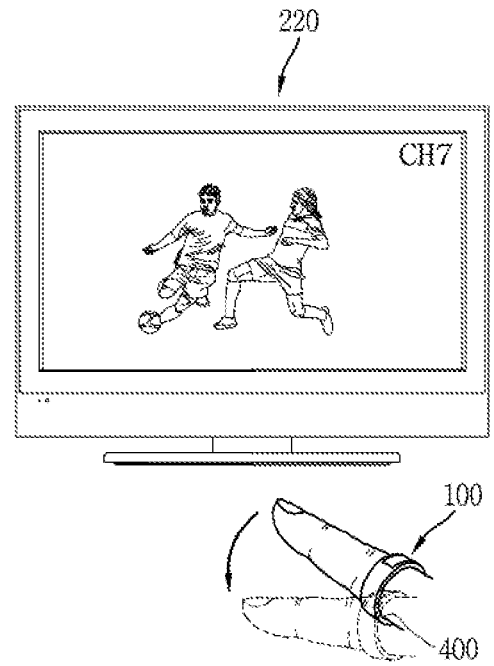
FIGS. 14A to 14D are conceptual views illustrating a control method for restricting a control of an external device based on a wearing position of a ring-type terminal in accordance with one embodiment.
Figure 14B:
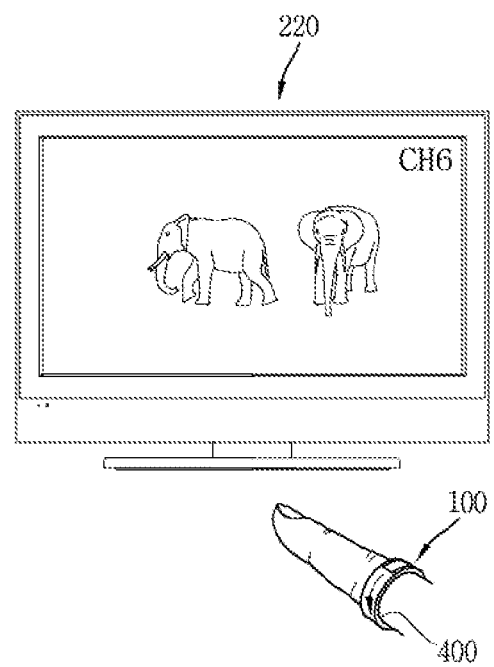
Figure 14C:
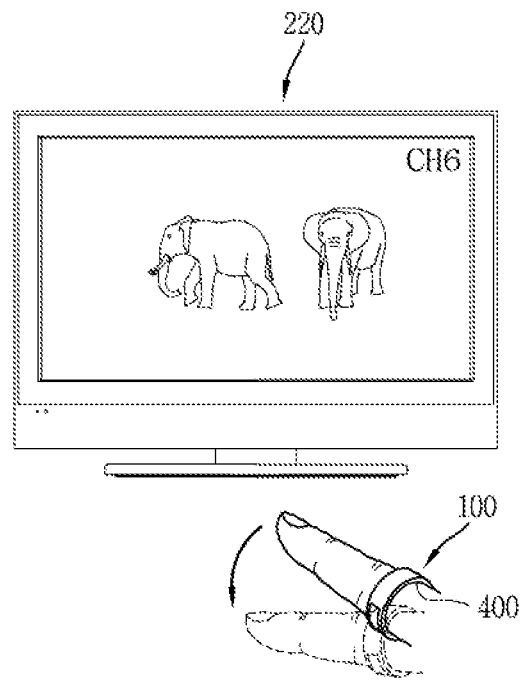
Figure 14D:
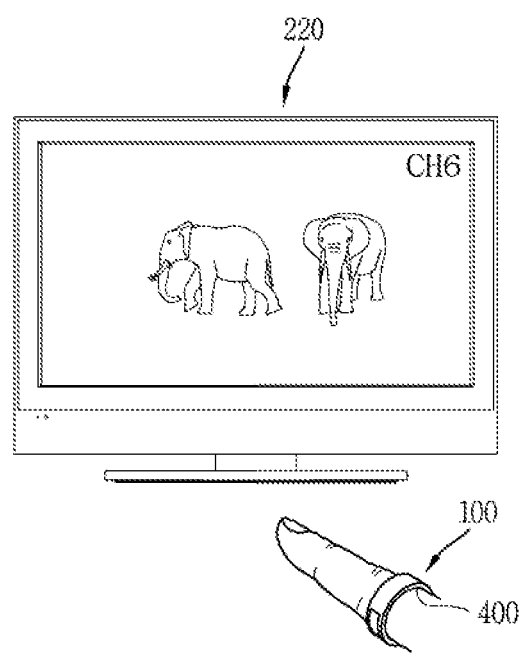

Referring to FIGS. 14A and 14B, when a gesture is sensed after the ring-type terminal 100 is worn on a finger, a control command for changing screen information related to a second external device 220 is generated. Referring to FIGS. 14C and 14D, when the rear region is exposed toward the back of the hand in response to the ring-type terminal 100 being turned around the user's finger, the generation of a control command based on the gesture is restricted. The wearing position of the ring-type terminal 100 may be decided by a fingerprint or twinkles of a finger, sensed by the fingerprint sensing module 400.

Accordingly, the user may freely move the hand (fingers) by restricting the control of an external device by changing the position of the ring-type terminal 100, without an input of a control command for restricting the control of the external device. Also, since the sensing of the control command is restricted by the user's intent, the ring-type terminal 100 may not have to keep sensing the user's control command, resulting in minimization of unnecessary power consumption.

Figure 15C:
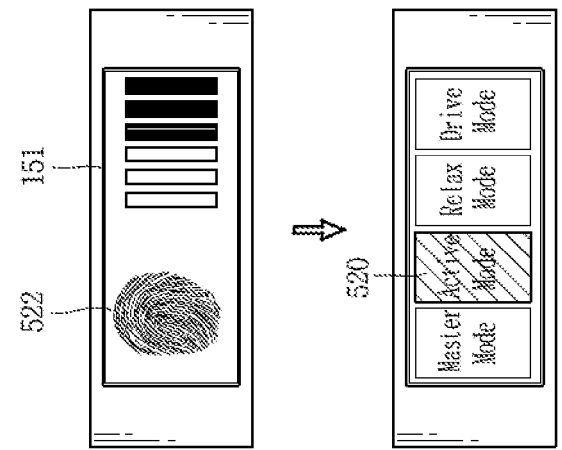
FIGS. 15A to 15C are conceptual views illustrating a control method for executing a mode based on biometric information using a blood flow sensing module in accordance with one embodiment.
Figure 15B:
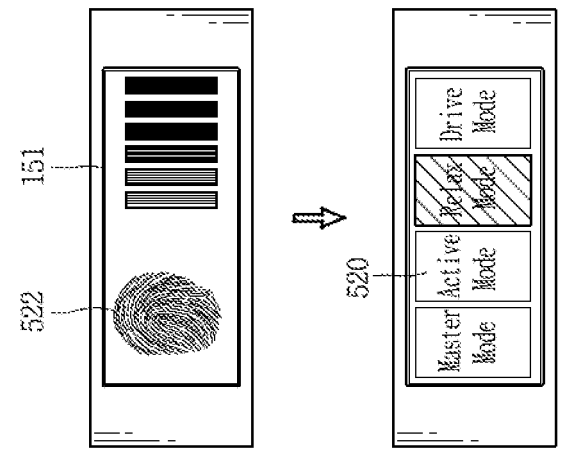
Figure 15A:
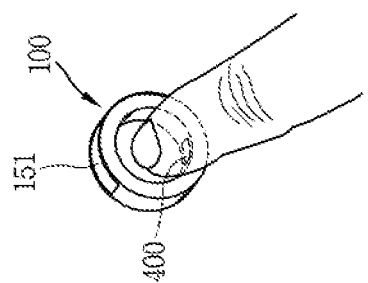

FIG. 15 illustrates a control command for executing a mode based on biometric information using a blood flow sensing module. Referring to FIGS. 6A and 6B and FIGS. 15A to 15C, the ring-type terminal 100 includes the blood flow sensing module 600 which collects biometric information which includes a blood flow of the user. The controller 180 according to this embodiment executes a different mode based on the biometric information.

The controller 180 controls the display unit 151 to output a biometric information image 522 which indicates biometric information sensed by the blood flow sensing module 600. The controller 180 then classifies a user's state based on the biometric information, and activates a mode corresponding to the state. For example, if a fast change of the blood flow is sensed, the controller 180 can determine it as a state of needing a break, and activate a relax mode.

Figure 16A:
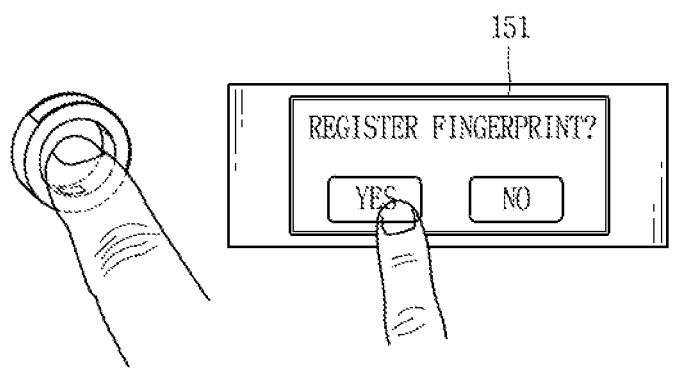
FIGS. 16A to 16C are conceptual views illustrating a control method for setting a function corresponding to a fingerprint in accordance with one embodiment.

FIG. 16 is a conceptual view illustrating a control method for setting a function corresponding to a fingerprint. As illustrated in FIG. 16(a), the fingerprint sensing module 400 recognizes the fingerprint, and the controller 180 controls the display unit 151 to output a check screen for checking whether or not to register (or store) the fingerprint. For example, the controller 180 searches for a reference fingerprint, which is decided as substantially the same as the fingerprint, in the memory 170. If the reference fingerprint has not been searched for in the memory 170, the controller 180 executes a setting function for registering the fingerprint.

Figure 16B:
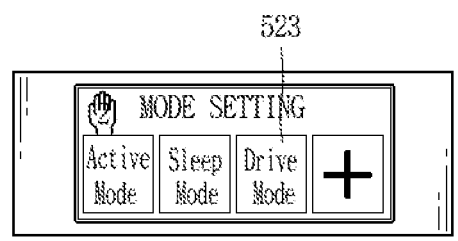
Figure 16C:
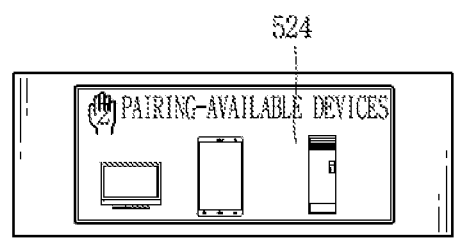

The controller 180 controls the display unit to output a setting screen for selecting a function corresponding to the fingerprint. Referring to FIG. 16(b), the controller 180 can output a first setting screen 523 for setting a mode corresponding to a finger having the fingerprint. Referring to FIG. 16(c), the controller 180 can output a second setting screen 524 for setting an external device which is to be controlled in correspondence with the finger having the fingerprint.

Figure 17A:
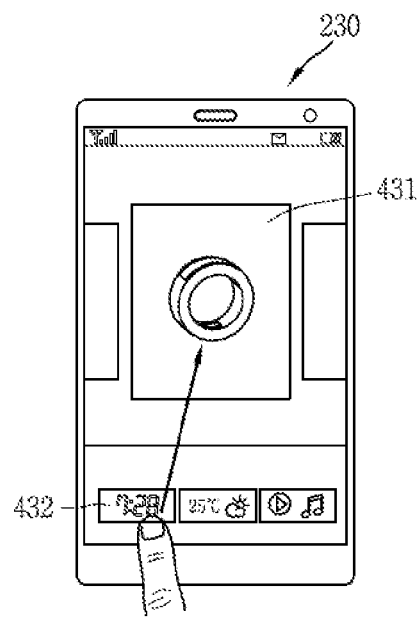
FIGS. 17A(a) to 17B(d) are conceptual views illustrating a control method for a ring-type terminal to output data of a mobile terminal interoperable therewith in accordance with embodiments.
Figure 17A:
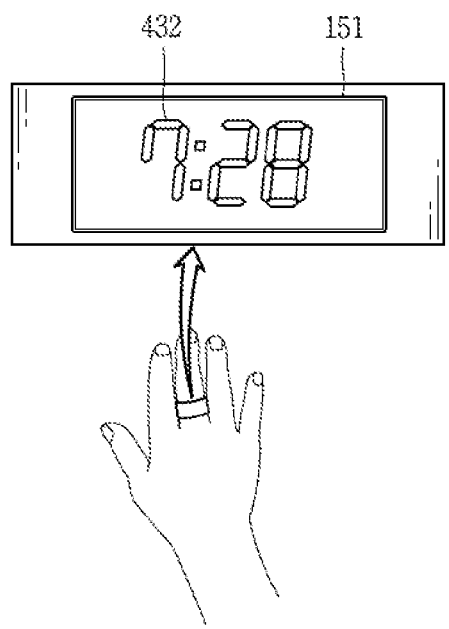

FIGS. 17A(a) to 17B(d) are conceptual views illustrating a control method for outputting data of an interoperable mobile terminal using a ring-type terminal. As illustrated in FIGS. 17A(a) and 17A(b), a display module of the mobile terminal outputs a first select window 431 for selecting data and a plurality of data 432. For example, the first select window 431 may output an image of the ring-type terminal, and the plurality of data 432 may correspond to functions operated by the mobile terminal.

In response to a touch input applied onto the display module of the mobile terminal, the display unit 151 of the ring-type terminal 100 is controlled to output the data. For example, the touch input may correspond to a dragging touch input which is first applied onto the data and then released on the select window 431.

Figure 17B:
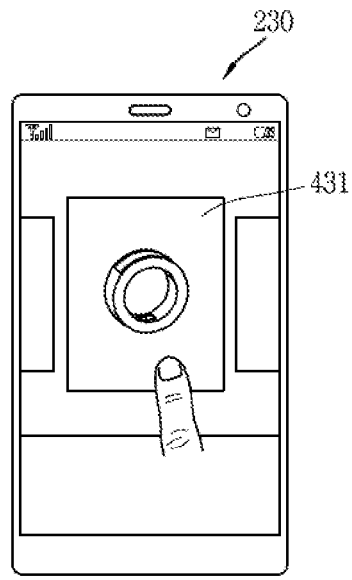
Figure 17B:
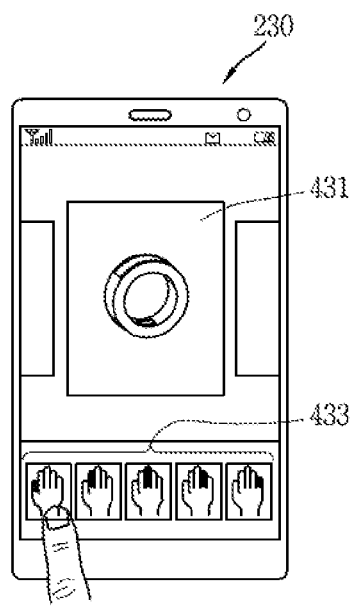
Figure 17B:
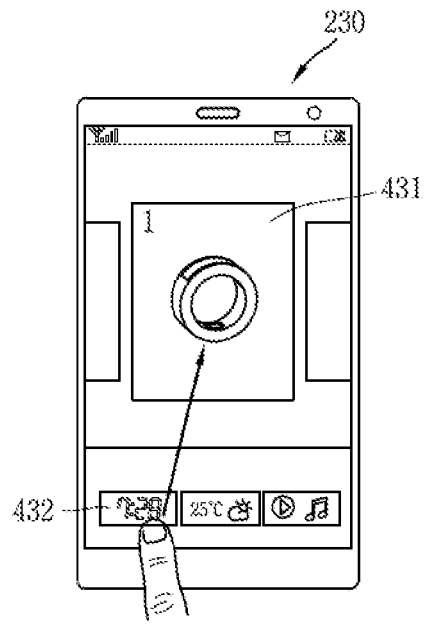
Figure 17B:
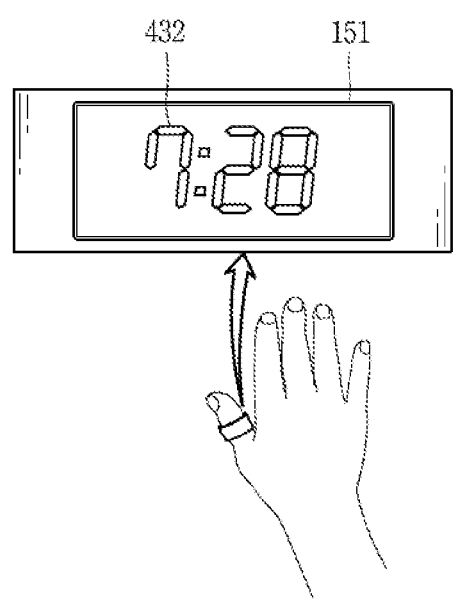

Hereinafter, a control method for setting data, which is to be output on the display unit 151, for each finger will be described with reference to FIGS. 17B(a) to 17B(d). Referring to FIGS. 17B(a) and 17B(b), when a touch input is applied to the first select window 431, the controller controls the display module to output a second select window 433 for selecting a user's finger. The second select window 433 is provided with a plurality of icons corresponding to the user's fingers, respectively. Five icons are exemplarily illustrated in the drawings, but the second select window may be provided with icons for selecting fingers of the user's right and left hands and another user's fingers.

The display module outputs the plurality of data 432 based on a touch input applied onto one of the icons. Also, the display module may output an image indicating the selected finger on the first select window 431.

The controller controls the display unit 151 of the ring-type terminal 100 to output the data based on a touch input applied onto the display module of the mobile terminal Here, when a fingerprint of the selected finger is sensed by the fingerprint sensing module 400, the controller controls the display unit 151 of the ring-type terminal 100 to output the selected data thereon. For example, when the fingerprint of the finger is sensed, the controller may activate the display unit 151 and control the display unit 151 to output the selected data.

Figure 18:
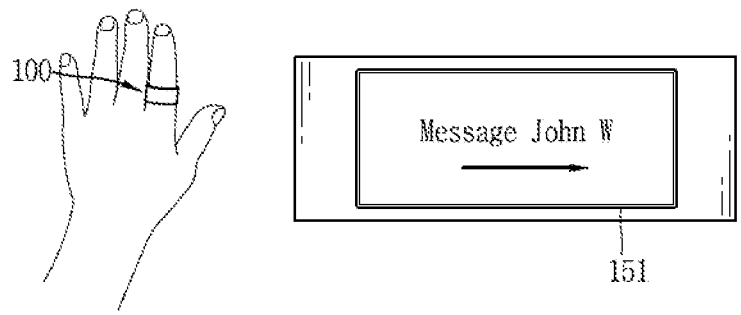
FIG. 18 is a conceptual view illustrating a method for controlling an output direction of screen information according to a finger sensed by a fingerprint sensing module in accordance with one embodiment.
Figure 18:
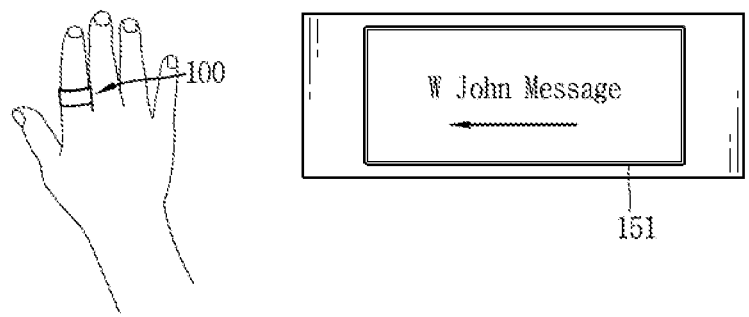

FIG. 18 illustrates a control method for outputting an output direction of screen information based on a hand sensed by a fingerprint sensing module. The fingerprint sensing module 400 may distinguish the user's right and left hands based on the fingerprint. When the ring-type terminal 100 according to this embodiment is worn on the left hand, an output direction of screen information is set to a left-to-right direction. When the ring-type terminal 100 is worn on the right hand, the output direction of the screen information is set to a right-to-left direction.

When the ring-type terminal 100 according to this embodiment is wirelessly connected to the mobile terminal 230, an output state of screen information, which is output on the display module of the mobile terminal 230, may be changed according to a finger on which the ring-type terminal 100 is worn. For example, a position of an icon which is included in the screen information to receive a touch input applied thereto, an output order of the screen information, an output position of a virtual keyboard, and the like may be changed according to a hand on which the ring-type terminal 100 is worn.

In addition, the fingerprint sensing module 400 may sense a direction of the ring type terminal, in which the finger is inserted, based on a shape of the fingerprint. Accordingly, the controller controls the display unit to output the screen information in an opposite direction to the direction that the finger is inserted.

Figure 19A:
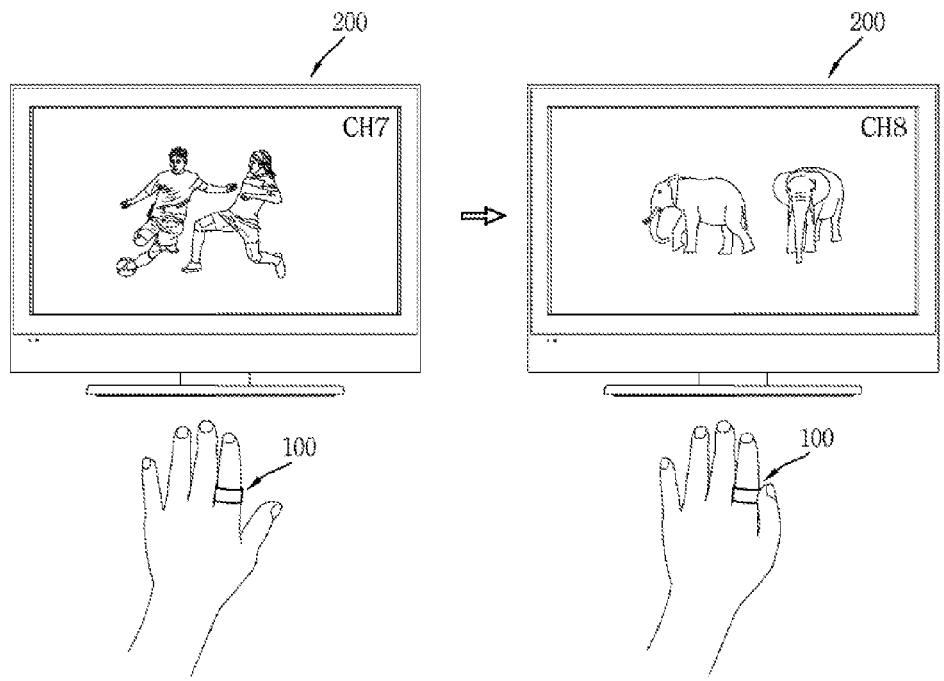
FIGS. 19A(a) to 19C(b) are conceptual views illustrating a method for forming a different control command based on a finger in accordance with embodiments.
Figure 19A:
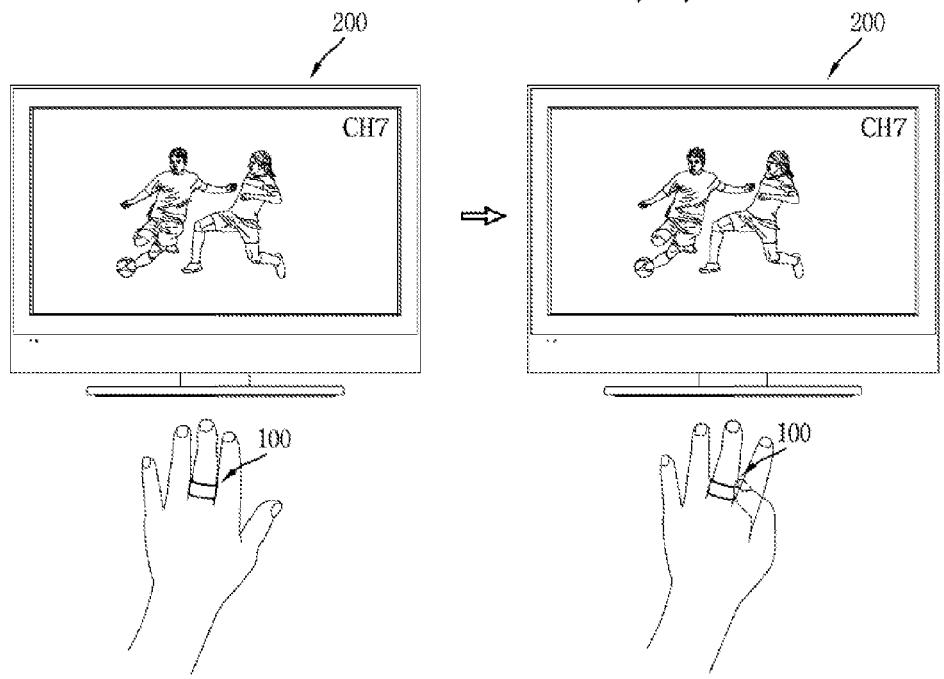
Figure 19B:
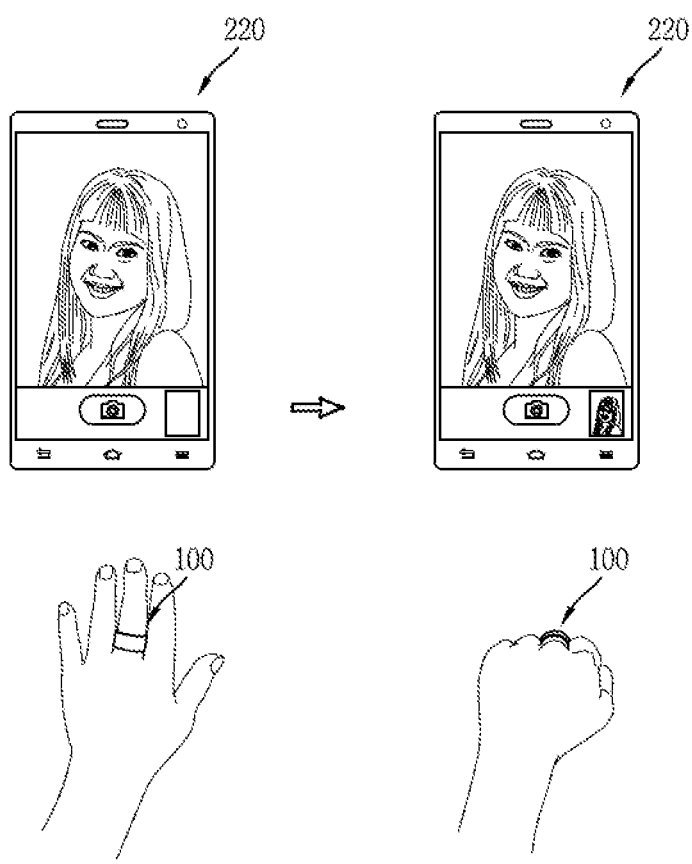
Figure 19C:
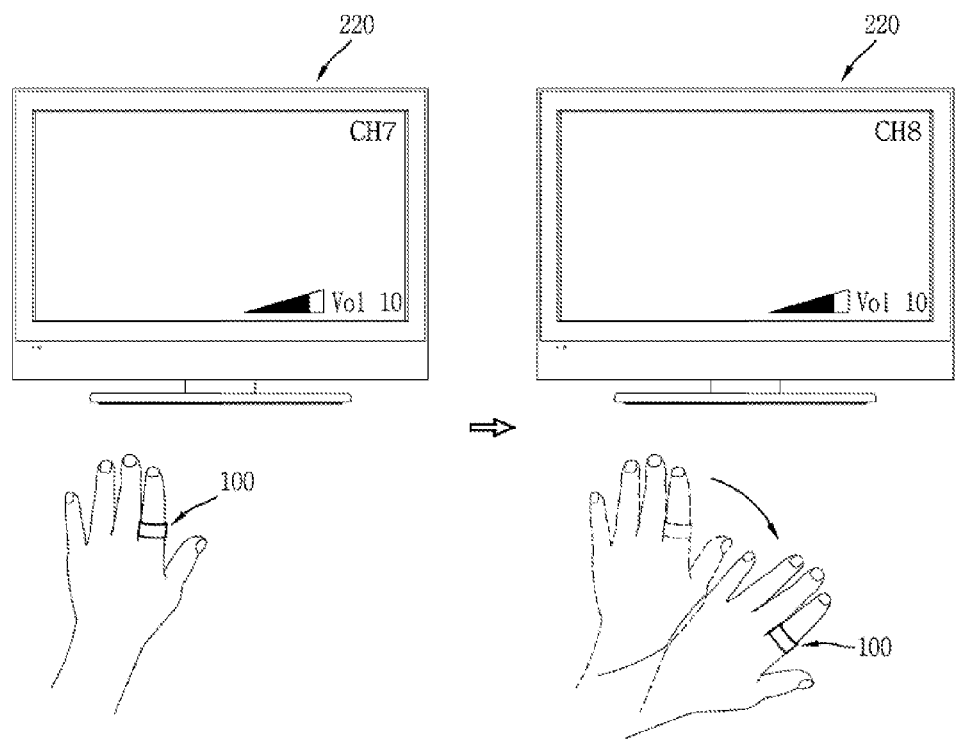
Figure 19C:
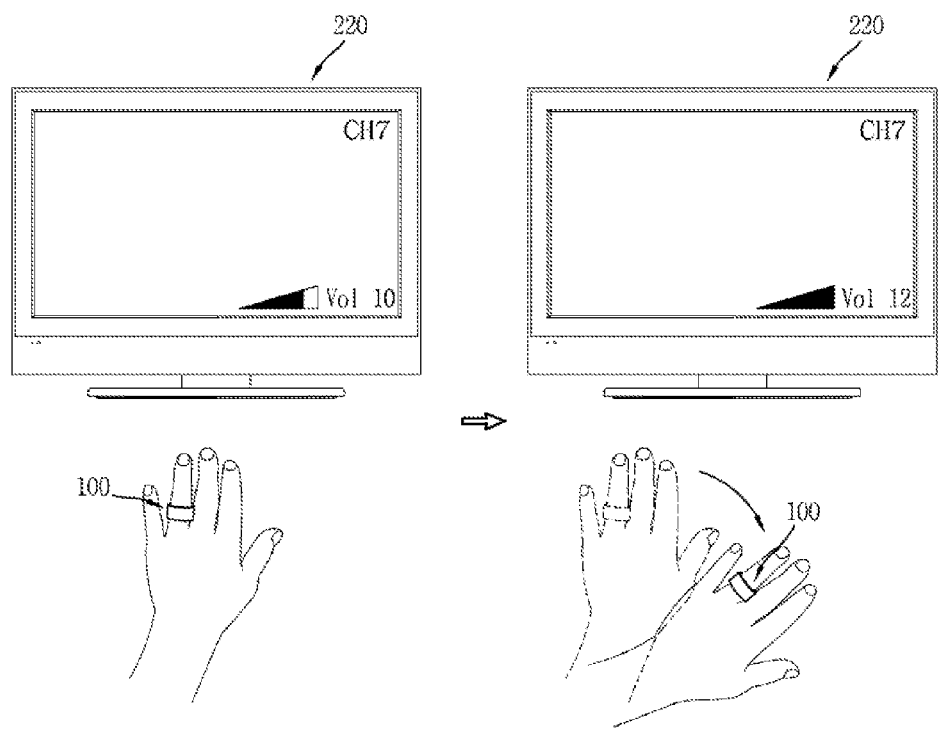

FIGS. 19A to 19C are conceptual views illustrating a method for generating a different control command based on a finger. Hereinafter, a control method for restricting a generation of a control command will be described with reference to FIGS. 19A(a) and 19A(b). FIG. 19A(a) illustrates a case where the ring-type terminal 100 is worn on the second finger and interworks with a second external device 220. The controller 180 generates a control command for changing screen information output on the second external device 220, based on a touch input applied to the touch sensor while the ring-type terminal 100 is worn on the second finger.

Here, referring to FIG. 19A(b), when the ring-type terminal 100 is worn on the third finger, the controller 180 restricts a touch input from being applied to the touch sensor. Accordingly, the controller 180 does not generate the control command even if substantially the same touch input is applied to the touch sensor.

Thus, when the ring-type terminal is worn on a specific finger, it may be possible to restrict a generation of a control command which is done based on a touch input which is applied on the contrary to the user's intention.

Hereinafter, a control method for generating a control command when the ring-type terminal 100 is worn on a specific finger will be described with reference to FIG. 19B. The ring-type terminal 100 according to this embodiment may further include a pressure sensor senses pressure applied onto the inner circumferential surface of the ring-type terminal 100. For example, when the ring-type terminal 100 is worn on the third finger, the controller 180 can activate the pressure sensor. The controller 180 can generate a control command for executing a specific function when the change of pressure applied to the inner circumferential surface is sensed by the pressure sensor based on a gesture of the user's hand.

For example, if the user closes a fist, the pressure sensor may sense the pressure change and accordingly the controller may generate a control command for executing capturing using a camera of the mobile terminal. That is, when the ring-type terminal 100 is worn on a specific finger, the controller 180 can control a function by activating a specific sensor.

Or, referring back to FIGS. 7B(a) to 7C(b), the inner circumferential surface of the ring-type terminal 100 may be changed in shape according to a change of a thickness of the finger, by the elastic portion E and the supporting portion 107 forming the inner frame 102 of the ring-type terminal 100. The sensor may sense a change of pressure applied in response to the change in the shape of the finger, thereby generating a control command.

Hereinafter, a control method for generating a different control command when the ring-type terminal 100 is worn on a different finger will be described with reference to FIGS. 19C(a) and 19C(b). For example, the ring-type terminal 100 wirelessly communicates with the second external device 220.

Referring to FIG. 19C(a), when a specific gesture is sensed while the ring-type terminal is worn on the second finger, the controller 180 generates a first control command for changing screen information. For example, when the second external device 220 corresponds to a TV, the first control command may correspond to a control command for changing a channel.

Meanwhile, referring to FIG. 19C(b), when the specific gesture is sensed while the ring-type terminal 100 is worn on the fourth finger corresponding to the ring finger, the controller 180 generates a second control command for adjusting a volume level of output sound. For example, in case where the specific gesture is a gesture moving to right, the controller generates a control command for changing a channel to a channel corresponding to an increasing channel number when the ring-type terminal 100 is worn on the second finger, and generates a control command for increasing a volume level when the ring-type terminal 100 is worn on the fourth finger.

This allows the user to select a target, which is to extend or increase based on the same gesture, according to a finger. Here, the first to fourth fingers are merely illustrative for the sake of explanation, and the control according to the type of finger may not be limited thereto.

Figure 20A:
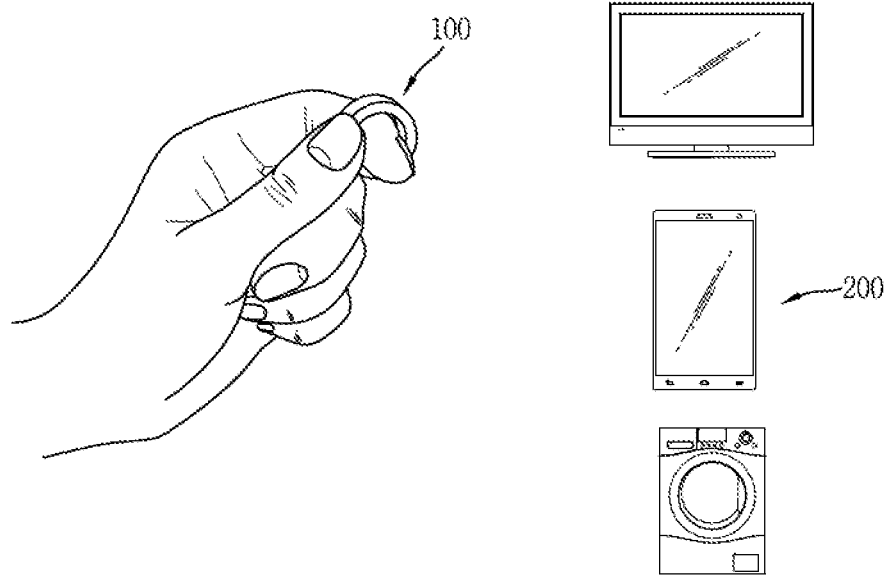
FIGS. 20(a) and 20(b) are conceptual views illustrating a control method for selectively controlling an external device based on a finger sensed by a touch sensor and a fingerprint sensing module in accordance with one embodiment.
Figure 20B:
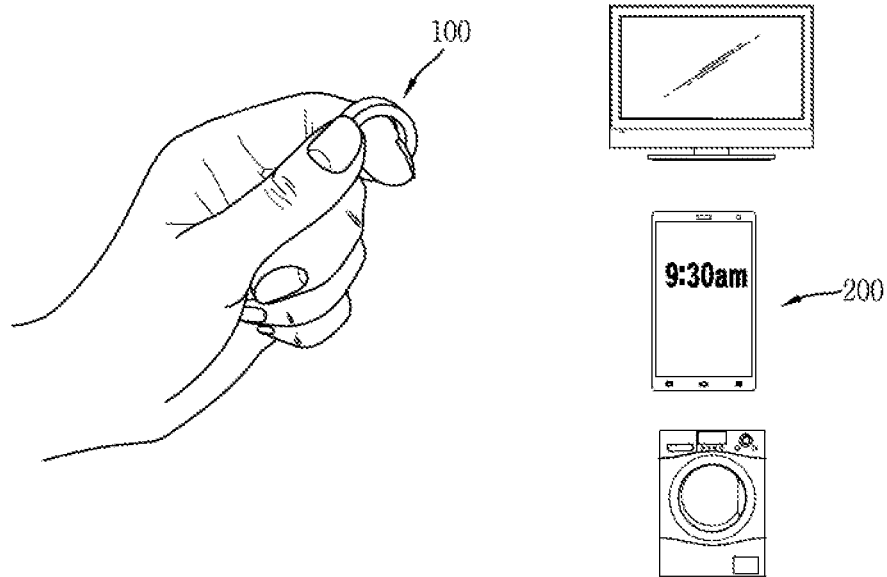
Figure 21A:
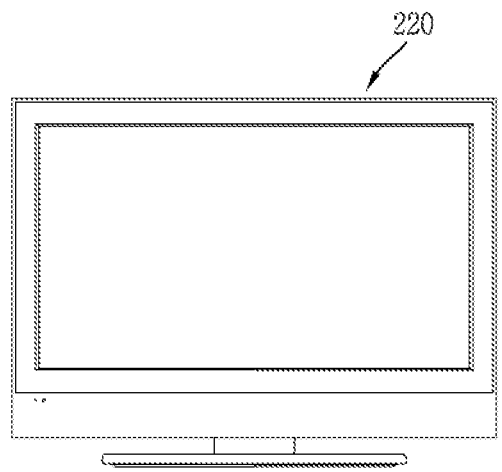
FIGS. 21(a) and 21(b) are conceptual views illustrating a different control method based on a different user's hand in accordance with one embodiment.
Figure 21A:
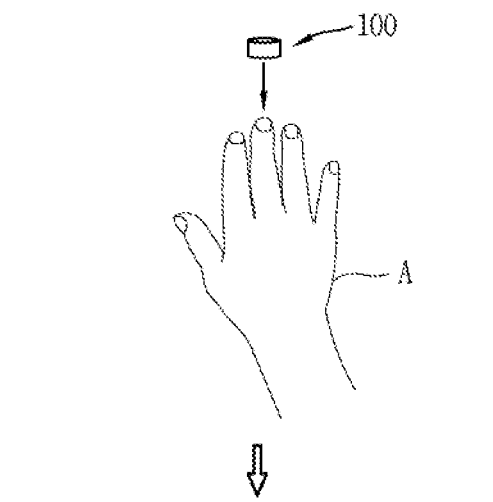
Figure 21A:
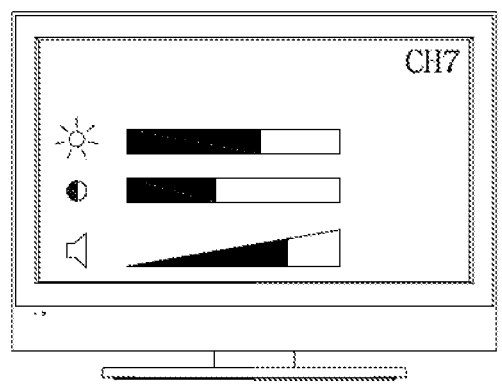
Figure 21B:
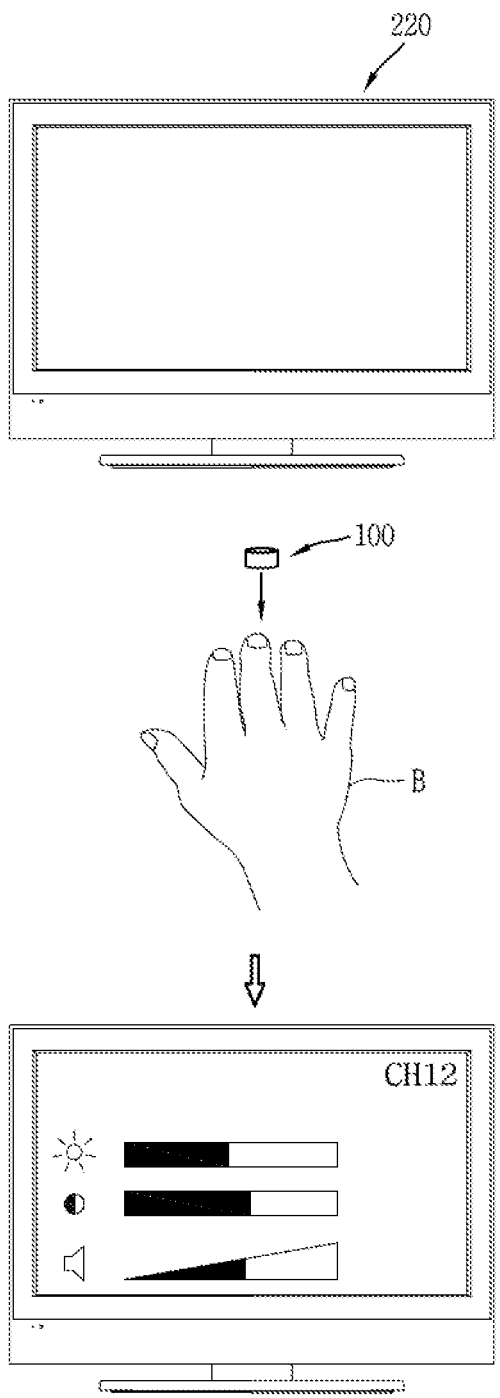

FIG. 20 illustrates a control method for selectively controlling an external device based on a finger detected by a touch sensor and a fingerprint sensing module. The ring-type terminal 100 according to this embodiment further includes a touch sensor which is provided on the outer circumferential surface thereof. The controller 180 controls the fingerprint sensing module 400 to sense a fingerprint of one of the user's two fingers which hold the ring-type terminal 100, and generates a control command for controlling the external device based on a touch input applied onto the touch sensor by the other finger.

The controller 180 can select at least one external device to control from a plurality of external devices based on the user's finger sensed by the fingerprint sensing module 400. For example, when the ring-type terminal 100 is wirelessly connected to a plurality of external devices and the plurality of external devices are in a power-off state, the controller 180 selects at least one external device corresponding to the fingerprint-sensed finger. The controller 180 generates a control command for turning on the selected external device based on the touch input. According to this embodiment, some of a plurality of wireless devices may be selectively activated for selectively controlling them based on the touch sensor and the fingerprint sensing module.

FIG. 21 is a conceptual view illustrating a different control method based on hands of different users. The memory 170 stores different control commands based on users, who are classified based on respective fingerprints sensed by the fingerprint sensing module.

When the ring-type terminal 100 is wirelessly connected with the second external device 220, the controller 180 generates a first control command for outputting screen information based on a first setting when a fingerprint of a hand A is sensed by the fingerprint sensing module 400. Meanwhile, the controller 180 generates a second control command for outputting screen information based on a second setting, which is different from the first setting, when a finger of a hand B is sensed by the fingerprint sensing module 400. Here, the first and second settings may correspond to an output state of screen information, brightness of the screen information, a type of the screen information (for example, a channel), a volume level and the like.

When the external device corresponds to a TV, the user may set channels to output in correspondence with his or her hands and fingers. That is, the user may set his or her preferable channels. Or, the controller 180 can collect and analyze information related to the user's preferable channels and information related to set states, and control the external device based on the analyzed results when the user's fingerprint is sensed. This may allow for controlling the external device based on the set state based on each user.

Further, in accordance with one embodiment of the present invention, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A ring-type terminal comprising:
 a main body configured to be placed on and surround a user's finger and including an insertion region in which the finger is inserted;
 a fingerprint sensor provided on at least one region of an inner circumferential surface of the main body and configured to recognize a fingerprint of the finger;

a guide module provided on the inner circumferential surface such that the finger comes in contact with the fingerprint sensor while the finger is inserted in the insertion region; and a controller configured to execute a function based on the fingerprint sensed by the fingerprint sensor, wherein the guide module overlaps the fingerprint sensor and protrudes from the inner circumferential surface when the finger is inserted into the insertion region, and wherein the guide module comprises:
- a guide plate overlapping the fingerprint sensor;
- an accommodating portion recessed into a part of the inner circumferential surface such that the guide plate is accommodated therein; and
- elastic members configured to elastically support the guide plate such that the guide plate protrudes from the accommodating portion.

2. The ring-type terminal of claim 1, further comprising:
a touch sensor provided on an outer circumferential surface of the main body and configured to receive the user's touch input,
wherein the controller is further configured to activate the fingerprint sensor based on the touch input.

3. The ring-type terminal of claim 2, wherein the fingerprint sensor includes a plurality of fingerprint sensing portions arranged along the inner circumferential surface, and
wherein the controller is further configured to activate some of the plurality of fingerprint sensing portions based on the touch input.

4. The ring-type terminal of claim 1, wherein the main body has an open-loop with a disconnection region, and the disconnection region extends due to an external force.

5. The ring-type terminal of claim 1, further comprising:
a wireless communication unit configured to execute a wireless connection with a mobile terminal having a display module,
wherein the controller is further configured to control the wireless communication unit to transmit a first control command for outputting a graphic image to the display module, the graphic image including information related to the finger.

6. The ring-type terminal of claim 5, wherein the controller is further configured to control the wireless communication unit to transmit a second control command for outputting a control screen to the display module, the control screen receiving a touch input applied to control an external device corresponding to the fingerprint.

7. The ring-type terminal of claim 5, further comprising:
a gesture sensor configured to sense a gesture of a hand,
wherein the controller is further configured to generate a third control command for controlling an external device corresponding to the fingerprint, based on the gesture.

8. The ring-type terminal of claim 7, wherein the controller is further configured to control the wireless communication unit to transmit to the mobile terminal a fourth control command for outputting a notification window to the display module, the notification window notifying the third control command.

9. The ring-type terminal of claim 1, further comprising:
a wireless communication unit configured to execute a wireless connection with a plurality of external devices; and
a gesture sensor to sense a gesture,
wherein the controller is further configured to control the wireless communication unit to transmit a control command generated based on the gesture to at least one of the plurality of external devices.

10. The ring-type terminal of claim 9, wherein the at least one external device is selected by the fingerprint sensed by the fingerprint sensor.

11. The ring-type terminal of claim 10, wherein the controller is further configured to generate a plurality of control commands based on the gesture when the plurality of external devices are selected by the fingerprint.

12. The ring-type terminal of claim 10, wherein the controller is further configured to generate different control commands corresponding to the fingerprint, based on the same gesture.

13. The ring-type terminal of claim 1, wherein the controller is further configured to activate a different control mode based on the fingerprint.

14. The ring-type terminal of claim 13, further comprising:
a blood flow sensor configured to sense the user's blood flow to collect biometric information,
wherein the controller is further configured to select the control mode based on the biometric information collected by the blood flow sensing module.

15. The ring-type terminal of claim 1, further comprising:
an electrode module including plus (+) and minus (−) electrodes disposed with interposing therebetween the insertion region in which the finger is inserted; and
a detection module configured to detect a movement of the finger into the insertion region.

16. The ring-type terminal of claim 15, wherein the controller is further configured to activate the fingerprint sensor when the movement of the finger is detected by the detection module, and convert the fingerprint sensor into an inactive state when the movement of the finger is not sensed for a preset reference time.

17. The ring-type terminal of claim 1, further comprising:
a display unit provided on an outer circumferential surface of the main body and configured to output visual information,
wherein the controller is further configured to change an output direction of the visual information from a left-to-right direction to a right-to-left direction or from the right-to-left direction to the left-to-right direction based on the fingerprint.

18. A ring-type terminal comprising:
a main body configured to be placed on and surround a user's finger and including an insertion region in which the finger is inserted;
a fingerprint sensor provided on at least one region of an inner circumferential surface of the main body and configured to recognize a fingerprint of the finger;
a guide module provided on the inner circumferential surface such that the finger comes in contact with the fingerprint sensor while the finger is inserted in the insertion region;
a controller configured to execute a function based on the fingerprint sensed by the fingerprint sensor; and
a touch sensor provided on an outer circumferential surface of the main body and configured to receive the user's touch input,
wherein the controller is further configured to activate the fingerprint sensor based on the touch input, and
wherein the guide module protrudes from the inner circumferential surface to cover opposite sides of the touch sensor so as to guide a movement of the finger toward the touch sensor.

19. A ring-type terminal comprising:
- a main body configured to be placed on and surround a user's finger and including an insertion region in which the finger is inserted;
- a fingerprint sensor provided on at least one region of an inner circumferential surface of the main body and configured to recognize a fingerprint of the finger;
- a guide module provided on the inner circumferential surface such that the finger comes in contact with the fingerprint sensor while the finger is inserted in the insertion region; and
- a controller configured to execute a function based on the fingerprint sensed by the fingerprint sensor, wherein the main body comprises:
- an outer frame that forms an appearance; and
- an inner frame that forms the inner circumferential surface and is movably mounted to the outer frame,
- wherein an inner circumferential surface of the inner frame extends to be moved adjacent to the outer frame by an external force applied from the insertion region.

* * * * *